(12) United States Patent
Namba et al.

(10) Patent No.: US 11,695,136 B2
(45) Date of Patent: Jul. 4, 2023

(54) FUEL CELL SYSTEM AND CONTROL METHOD FOR FUEL CELL SYSTEM

(71) Applicant: TOYOTA JIDOSHA KABUSHIKI KAISHA, Toyota (JP)

(72) Inventors: Ryouichi Namba, Okazaki (JP); Masahiro Ito, Toyota (JP); Koro Fujio, Toyota (JP); Hiroyuki Tsunekawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/233,869

(22) Filed: Apr. 19, 2021

(65) Prior Publication Data

US 2021/0376347 A1 Dec. 2, 2021

(30) Foreign Application Priority Data

May 29, 2020 (JP) .................... 2020-094364

(51) Int. Cl.
*H01M 8/04223* (2016.01)
*H01M 8/0432* (2016.01)
(Continued)

(52) U.S. Cl.
CPC ... *H01M 8/04302* (2016.02); *H01M 8/04225* (2016.02); *H01M 8/04231* (2013.01);
(Continued)

(58) Field of Classification Search
CPC ......... H01M 8/04302; H01M 8/04225; H01M 8/04231; H01M 8/04365; H01M 8/04731; H01M 8/04902; H01M 8/04932; H01M 2250/20; H01M 8/0432; H01M 8/04537; H01M 8/0491; H01M 8/0494;
(Continued)

(56) References Cited

U.S. PATENT DOCUMENTS

| 2006/0073367 A1 | 4/2006 | Kanno et al. |
| 2009/0110970 A1* | 4/2009 | Tejima ............ H01M 8/04589 429/429 |

(Continued)

FOREIGN PATENT DOCUMENTS

| JP | 2004311277 A | 11/2004 |
| JP | 2008300262 A | 12/2008 |

(Continued)

*Primary Examiner* — Christian Roldan
(74) *Attorney, Agent, or Firm* — Dickinson Wright, PLLC

(57) ABSTRACT

The control device is configured so that when a temperature of the fuel cell at the time of start of power generation of the fuel cell is less than a standard temperature, it makes the fuel cell generate power so that the amount of heat generation of the fuel cell accompanying the power generation loss becomes a first amount of heat generation and so that when a cumulative value of current of a time period during which the fuel cell is made to generate power so that the amount of heat generation becomes the first amount of heat generation is equal to or greater than a predetermined cumulative value, it makes the fuel cell generate power so that the amount of heat generation becomes a second amount of heat generation larger than the first amount of heat generation.

5 Claims, 15 Drawing Sheets

(51) Int. Cl.
  *H01M 8/04701*    (2016.01)
  *H01M 8/04858*    (2016.01)
  *H01M 8/04302*    (2016.01)
  *H01M 8/04225*    (2016.01)

(52) U.S. Cl.
  CPC ... *H01M 8/04365* (2013.01); *H01M 8/04731* (2013.01); *H01M 8/04902* (2013.01); *H01M 8/04932* (2013.01); *H01M 2250/20* (2013.01)

(58) Field of Classification Search
  CPC ......... H01M 8/04268; H01M 8/04179; H01M 8/04228; H01M 8/04574
  USPC ........................................................ 429/429
  See application file for complete search history.

(56) References Cited

U.S. PATENT DOCUMENTS

| | | | | |
|---|---|---|---|---|
| 2009/0269628 | A1* | 10/2009 | Imanishi | H01M 8/04761 |
| | | | | 429/421 |
| 2010/0167148 | A1* | 7/2010 | Manabe | H01M 8/04768 |
| | | | | 429/434 |
| 2011/0140547 | A1* | 6/2011 | Shimura | H01M 8/1011 |
| | | | | 429/432 |
| 2011/0293972 | A1* | 12/2011 | Naganuma | H01M 8/04007 |
| | | | | 429/9 |
| 2016/0141667 | A1 | 5/2016 | Kaneko et al. | |

FOREIGN PATENT DOCUMENTS

| | | |
|---|---|---|
| JP | 2013-239290 A | 11/2013 |
| JP | 2016096041 A | 5/2016 |
| WO | 2011/148426 A1 | 12/2011 |

\* cited by examiner

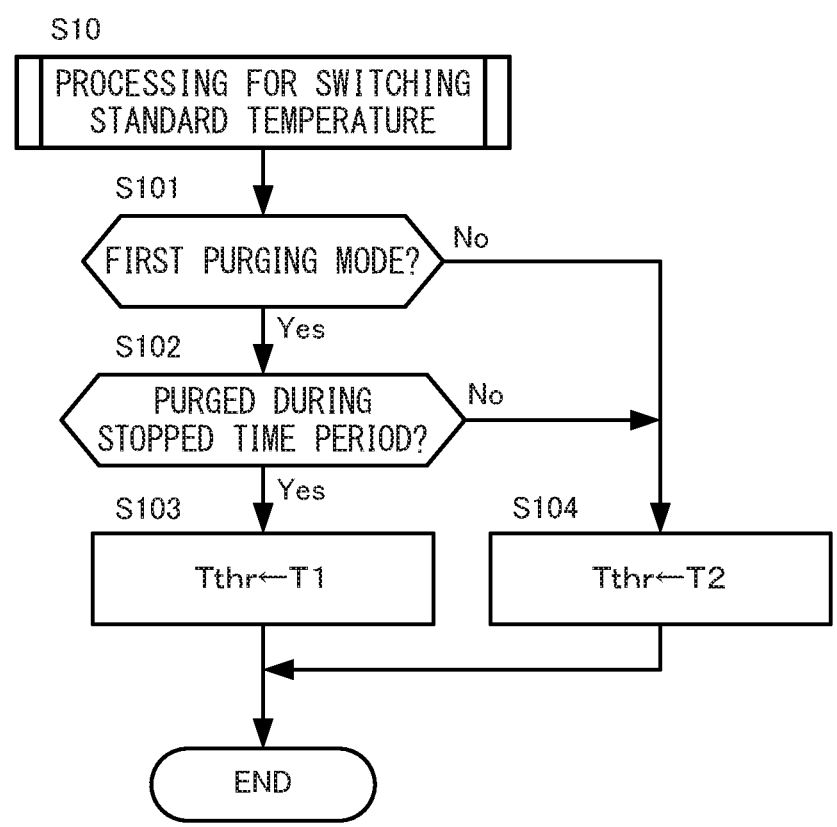

FUEL CELL SYSTEM AND CONTROL METHOD FOR FUEL CELL SYSTEM

FIELD

The present disclosure relates to a fuel cell system and a control method for a fuel cell system.

BACKGROUND

Japanese Unexamined Patent Publication No. 2016-96041 discloses, as a conventional fuel cell system, one which performs low efficiency power generation, where the power generation loss becomes greater than normal power generation, at the time of system startup to thereby perform a rapid warmup operation for making the amount of self heat generation of the fuel cell increase to make the fuel cell rapidly warm up.

SUMMARY

A resistance of a fuel cell tends to become higher the lower the temperature of the fuel cell or the drier the electrolytic membranes of the fuel cell. Resistance overvoltage, a cause of a drop in voltage, becomes greater proportional to an increase of the resistance of the fuel cell and becomes greater proportional to an increase of an output current of the fuel cell. Further, at the time of low efficiency power generation, if the generated electric power is the same, the output current of the fuel cell becomes greater than the time of normal power generation, so if low efficiency power generation is performed when the temperature of the fuel cell is low in the state where the fuel cell is dried, the voltage of the fuel cell will fall along with the increase of the resistance overvoltage and is liable to become a negative voltage. If the voltage of the fuel cell becomes a negative voltage, that fuel cell is liable to deteriorate.

The present disclosure was made focusing on such a problem point and has as its object to keep the voltage of the fuel cell from becoming a negative voltage at the time of low efficiency power generation.

To solve this technical problem, the fuel cell system according to one aspect of the present disclosure comprises a fuel cell configured to generate electric power by electrochemical reactions between a fuel gas and oxidizing agent gas and with a control device. The control device comprises a low efficiency power generation part configured to perform low efficiency power generation with a power generation loss larger than normal power generation. The low efficiency power generation part is configured so that when a temperature of the fuel cell at the time of start of power generation of the fuel cell is less than a standard temperature, it makes the fuel cell generate power so that the amount of heat generation of the fuel cell accompanying power generation loss becomes a first amount of heat generation and so that when a cumulative value of current of a time period during which the fuel cell is made to generate power so that the amount of heat generation becomes the first amount of heat generation is equal to or greater than a predetermined cumulative value, it makes the fuel cell generate power so that the amount of heat generation becomes a second amount of heat generation larger than the first amount of heat generation.

Further, a control method for the fuel cell system according to one aspect of the present disclosure comprises: performing low efficiency power generation with a power generation loss larger than normal power generation; making the fuel cell generate power so that the amount of heat generation of the fuel cell accompanying the power generation loss becomes a first amount of heat generation when a temperature of the fuel cell at the time of start of power generation of the fuel cell is less than a standard temperature; and making the fuel cell generate power so that the amount of heat generation becomes a second amount of heat generation larger than the first amount of heat generation when a cumulative value of current of a time period during which the fuel cell is made to generate power so that the amount of heat generation becomes the first amount of heat generation is equal to or greater than a predetermined cumulative value.

According to these aspect of the present disclosure, when the temperature of the fuel cell is lower than the standard temperature, low efficiency power generation where the amount of heat generation is relatively kept down is performed. That is, when the temperature of the fuel cell is lower than the standard temperature, low efficiency power generation where the output current of the fuel cell is relatively kept down is performed. Even if the fuel cell has dried, it is possible to keep down the resistance overvoltage of that fuel cell. For this reason, at the time of low efficiency power generation, the voltage of the fuel cell can be kept from becoming a negative voltage.

BRIEF DESCRIPTION OF DRAWINGS

FIG. 15 is a flow chart explaining processing for switching a standard temperature.

DESCRIPTION OF EMBODIMENTS

Below, an embodiment of the present disclosure will be explained in detail with reference to the drawings. Note that, in the following explanation, similar component elements dare assigned the same reference notations.

First Embodiment

Figure 1:
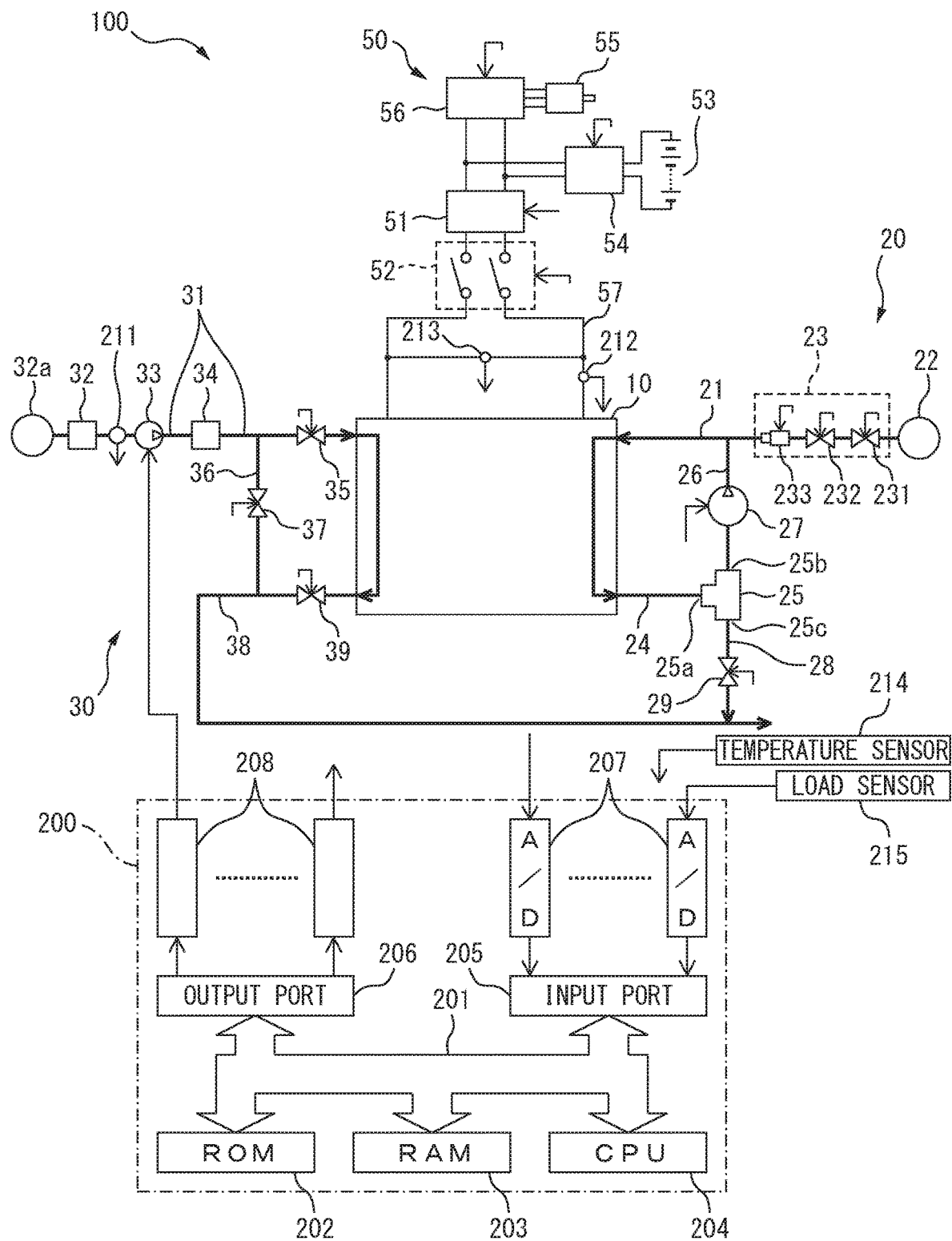
FIG. 1 is a schematic view of the configuration of a fuel cell system according to a first embodiment of the present disclosure.

FIG. 1 is a schematic view of the configuration of a fuel cell system 100 according to a first embodiment of the present disclosure mounted in a vehicle.

The fuel cell system 100 is provided with a fuel cell stack 10, a hydrogen feed device 20 for supplying hydrogen to the fuel cell stack 10 as an anode gas (fuel gas), an air feed device 30 for supplying air to the fuel cell stack 10 as a cathode gas (oxidizing agent gas), an electrical load part 50 electrically connected to an output terminal of the fuel cell stack 10, and an electronic control unit 200 for overall control of the various control parts of the fuel cell system 100.

The fuel cell stack 10 is comprised of a plurality of fuel cell unit cells (hereinafter referred to as "unit cells") stacked together along the stacking direction with the unit cells electrically connected in series. The unit cells are provided with MEA (membrane electrode assemblies).

Each MEA is comprised of a proton conducting ion exchange membrane formed by a solid polymer material (hereinafter referred to as a "electrolytic membrane") on one surface of which an anode electrode is formed and on the other surface a cathode electrode is formed—all of which are integrally joined. When electric power is being generated at the fuel cell stack 10, the following electrochemical reactions occur at the anode electrode and cathode electrode:

$$\text{Anode electrode: } 2H_2 \rightarrow H^+ + 4e^- \quad (1)$$

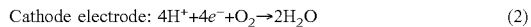

$$\text{Cathode electrode: } 4H^+ + 4e^- + O_2 \rightarrow 2H_2O \quad (2)$$

The anode electrode and the cathode electrode are respectively provided with catalyst layers comprised of porous carbon materials in which a catalyst is supported. The catalyst layers contain platinum as a catalyst for promoting the electrochemical reactions between the hydrogen and oxygen (hydrogen oxidation reaction of formula (1) and oxygen reduction reaction of formula (2)). Note that, the two outer sides of the MEA may also further be provided with an anode gas diffusion layer and a cathode gas diffusion layer.

The hydrogen feed device 20 is provided with a hydrogen feed pipe 21, a high pressure hydrogen tank 22 as a hydrogen source, a hydrogen feed control part 23, an anode off-gas pipe 24, a gas-liquid separator 25, a hydrogen return pipe 26, a hydrogen recirculation pump 27, a purge pipe 28, and a purge control valve 29.

The hydrogen feed pipe 21 is a pipe through which hydrogen supplied to the fuel cell stack 10 flows. One end is connected to the high pressure hydrogen tank 22, while the other end is connected to the fuel cell stack 10.

The high pressure hydrogen tank 22 stores the hydrogen supplied through the hydrogen feed pipe 21 to the fuel cell stack 10 and in turn the anode electrodes of the unit cells.

The hydrogen feed control part 23 is provided with a main check valve 231, a regulator 232, and an injector 233.

The main check valve 231 is a solenoid valve which is opened and closed by the electronic control unit 200 and is provided at the hydrogen feed pipe 21. If the main check valve 231 is opened, hydrogen flows out from the high pressure hydrogen tank 22 to the hydrogen feed pipe 21. If the main check valve 231 is closed, the outflow of hydrogen from the high pressure hydrogen tank 22 is stopped.

The regulator 232 is provided at the hydrogen feed pipe 21 downstream from the main check valve 231. The regulator 232 is a pressure control valve able to be adjusted in opening degree continuously or in steps. Its opening degree is controlled by the electronic control unit 200. By controlling the opening degree of the regulator 232, the pressure of the hydrogen at the downstream side from the regulator 232, that is, the pressure of the hydrogen injected from the injector 233, is controlled.

The injector 233 is provided at the hydrogen feed pipe 21 downstream from the regulator 232. The injector 233 is, for example, a needle valve and is controlled to open and close by the electronic control unit 200. By controlling the opening time period of the injector 233, the flow rate of the hydrogen injected from the injector 233 is controlled.

In this way, using the hydrogen feed control part 23, the feed of hydrogen from the high pressure hydrogen tank 22 to the fuel cell stack 10 is controlled. That is, using the hydrogen feed control part 23, hydrogen controlled to the desired pressure and flow rate is supplied to the fuel cell stack 10.

The anode off-gas pipe 24 is a pipe through which anode off-gas which had flowed out from the fuel cell stack 10 flows. One end is connected to the fuel cell stack 10, while the other end is connected to a gas inflow port 25a of the gas-liquid separator 25. The anode off-gas is gas containing the excess hydrogen which was not used for the electrochemical reactions in each unit cell and the nitrogen and other inert gas and water content (liquid water and steam) which permeated from the cathode side through the MEA to the anode electrode side.

The gas-liquid separator 25 is provided with a gas inflow port 25a, a gas outflow port 25b, and a liquid water outflow port 25c. The gas-liquid separator 25 separates the water in the anode off-gas flowing from the gas inflow port 25a to the inside. Further, the gas-liquid separator 25 discharges the separated water from the liquid water outflow port 25c to a purge pipe 28 and discharges the anode off-gas containing hydrogen from which water was separated from the gas outflow port 25b to a hydrogen return pipe 26.

The hydrogen return pipe 26 is a pipe with one end connected to the gas outflow port 25b of the gas-liquid separator 25 and with the other end connected to the hydrogen feed pipe 21 downstream from the hydrogen feed control part 23. At the hydrogen return pipe 26, the anode off-gas discharged from the gas outflow port 25b of the gas-liquid separator 25 flows.

The hydrogen recirculation pump 27 is provided at the hydrogen return pipe 26. The hydrogen recirculation pump 27 is a pump for recirculating the hydrogen contained in the anode off-gas, that is, the excess hydrogen which was not used for the electrochemical reactions in each cell, by returning it to the hydrogen feed pipe 21. The hydrogen recirculation pump 27 pressurizes the anode off-gas discharged from the gas outflow port 25b of the gas-liquid separator 25 and pumps it to the hydrogen feed pipe 21.

The purge pipe 28 is a pipe with one end connected to the liquid water outflow port 25c of the gas-liquid separator 25 and with the other end connected to a later explained cathode off-gas pipe 38.

The purge control valve 29 is a solenoid valve which is opened and closed by the electronic control unit 200 and is provided at the purge pipe 28. The purge control valve 29 is usually closed and is periodically opened over short time periods. If the purge control valve 29 is opened, the water separated inside the gas-liquid separator 25 is discharged through the purge pipe 28 from the cathode off-gas pipe 38 to the outside.

In this way, the fuel cell system 100 according to the present embodiment is a hydrogen recirculation type of fuel cell system which recirculates the anode off-gas flowing out from the hydrogen passage 2 by returning it to the hydrogen feed pipe 21, but it may also be made a nonhydrogen recirculating type of fuel cell system in which the anode off-gas flowing out from the hydrogen passage 2 is not returned to the hydrogen feed pipe 21.

The air feed device 30 is provided with an air feed pipe 31, air cleaner 32, compressor 33, intercooler 34, cathode inlet valve 35, bypass pipe 36, distribution valve 37, cathode off-gas pipe 38, and cathode pressure control valve 39.

The air feed pipe 31 is a pipe through which air flows for supply to the fuel cell stack 10 and in turn the cathode electrode of each unit cell. One end is connected to the air cleaner 32, while the other end is connected to the fuel cell stack 10.

The air cleaner 32 removes the foreign matter in the air sucked into the air feed pipe 31. The air cleaner 32 is arranged in the atmosphere which serves as the oxygen source 32a. That is, the oxygen source 32a communicates with the air feed pipe 31 through the air cleaner 32.

The compressor 33, for example, is a centrifugal type or axial flow type of turbo compressor and is provided at the air feed pipe 31. The compressor 33 compresses and discharges the air sucked into the air feed pipe 31 through the air cleaner 32. Note that, at the air feed pipe 31 upstream from the compressor 33, a cathode flow rate sensor 211 is provided for detecting the flow rate of air sucked in and discharged by the compressor 33 (below, referred to as the "total air feed quantity") Qacp [NL/min].

The intercooler 34 is provided at the air feed pipe 31 downstream from the compressor 33 and cools the air discharged from the compressor 33 for example by the outside air stream or cooling water etc.

The cathode inlet valve 35 is a valve which is opened and closed by the electronic control unit 200 and is provided at the air feed pipe 31 downstream from the intercooler 34. The cathode inlet valve 35 is opened when it is necessary to supply air to the fuel cell stack 10.

The bypass pipe 36 is a pipe for making part or all of the air discharged from the compressor 33 directly flow into the later explained cathode off-gas pipe 38 without passing through the fuel cell stack 10 in accordance with need. The bypass pipe 36 is connected at one end to the air feed pipe 31 between the intercooler 34 and cathode inlet valve 35 and at the other end to the cathode off-gas pipe 38 downstream from the later explained cathode pressure control valve 39.

The distribution valve 37 is provided in the bypass pipe 36. The distribution valve 37 is a solenoid valve which can be adjusted in opening degree continuously or in steps. Its opening degree is controlled by the electronic control unit 200.

The cathode off-gas pipe 38 is a pipe through which cathode off-gas flowing out from the fuel cell stack 10 flows. One end is connected to the fuel cell stack 10, while the other end is opened to the atmosphere. The cathode off-gas is a gas containing the excess oxygen which was not used for the electrochemical reactions in each unit cell and the nitrogen or other inert gas and water content generated by the electrochemical reactions (liquid water or steam).

The cathode pressure control valve 39 is provided in the cathode off-gas pipe 38. The cathode pressure control valve 39 is a solenoid valve which can be adjusted in opening degree continuously or in steps. Its opening degree is controlled by the electronic control unit 200. By controlling the opening degree of the cathode pressure control valve 39, the pressure inside the fuel cell stack 10, that is, the cathode pressure, is controlled.

By controlling the compressor 33 and in turn the total air feed quantity Qafc and the respective opening degrees of the cathode inlet valve 35, distribution valve 37, and cathode pressure control valve 39, the flow rate Qfc [NL/min] of the air supplied to the fuel cell stack 10 in the air discharged from the compressor 33 (below, referred to as the "FC air feed quantity") is controlled.

The electrical load part 50 is provided with a first converter 51, circuit breaker 52, battery 53, second converter 54, motor-generator 55, and inverter 56.

At the connection line 57 between the electrical load part 50 and the output terminal of the fuel cell stack 10, a current sensor 212 for detecting the current Ifc [A] taken out from the fuel cell stack 10 (below, referred to as the "FC current") and a voltage sensor 213 for detecting the terminal voltage Vfc [V] of the output terminal of the fuel cell stack 10 (below, referred to as the "FC voltage") are provided.

The first converter 51 is a bidirectional DC/DC converter provided with an electrical circuit able to raise and lower the terminal voltage at the primary side terminal. The primary side terminal is connected to the output terminal of the fuel cell stack 10 while the secondary side terminal is connected to the DC side terminal of the inverter 56. The first converter 51 raises and lowers the FC output voltage Vfc becoming the primary side terminal voltage based on a control signal from the electronic control unit 200 and due to this controls the FC current Ifc to the target FC current Itg set according to the operating state of the fuel cell system 100.

The circuit breaker 52 is opened and closed by the electronic control unit 200 and electrically and physically connects or disconnects the fuel cell stack 10 and the electrical load part 50.

The battery 53, for example, is a nickel-cadmium storage battery, a nickel-hydrogen storage battery, a lithium ion battery, or other rechargeable secondary cell. The battery 53 is charged with excess electric power of the fuel cell stack 10 and regenerated electric power of the motor-generator 55. The electric power charged to the battery 53 is in accordance with need used for driving the motor-generator 55, compressor 33, and other various types of control parts which the fuel cell system 100 is provided with.

The second converter 54 is, for example, a bidirectional DC/DC converter provided with an electrical circuit able to raise and lower the terminal voltage of the secondary side terminal. Its primary side terminal is connected to the output terminal of the battery 53 while its secondary side terminal is connected to the DC side terminal of the inverter 56. The second converter 54 makes the input voltage of the inverter 56 becoming the terminal voltage of the secondary side rise and fall based on the control signal from the electronic control unit 200.

The motor-generator 55 is, for example, a three-phase permanent magnet type synchronous motor which is provided with a function as a motor for generating drive power of the vehicle in which the fuel cell system 100 is mounted and a function as a generator generating electric power at the time of deceleration of the vehicle. The motor-generator 55 is connected to the AC side terminal of the inverter 56 and is driven by the generated electric power of the fuel cell stack 10 and the electric power of the battery 53.

The inverter 56 is provided with an electric circuit able to convert DC current input from a DC side terminal to AC current based on a control signal from the electronic control unit 200 and output it from the AC side terminal and conversely able to convert AC current input from an AC side terminal to DC current based on a control signal from the electronic control unit 200 and output it from the DC side terminal. The DC side terminal of the inverter 56 is connected to the secondary side terminals of the first converter 51 and the second converter 54 while the AC side terminal of the inverter 56 is connected to the input and output terminal of the motor-generator 55. When making the motor-generator 55 function as a motor, the inverter 56 converts the DC current from the fuel cell stack 10 and the battery 53 to AC current (in the present embodiment, three-phase AC current) to supply it to the motor-generator 55. On the other hand, when making the motor-generator 55 function as a generator, the inverter 56 converts the AC current from the motor-generator 55 to DC current to supply it to the battery 53 etc.

The electronic control unit 200 is comprised of a digital computer provided with components connected to each other by a bidirectional bus 201 such as a ROM (read only memory) 202, RAM (random access memory) 203, CPU (microprocessor) 204, input port 205, and output port 206.

At the input port 205, output signals of not only the above-mentioned cathode flow rate sensor 211 or current sensor 212 or voltage sensor 213, but also an FC temperature sensor 214 for detecting the temperature Tfc [° C.] of the fuel cell stack 10 (below, referred to as the "FC temperature"), a load sensor 215 for detecting an amount of depression of an accelerator pedal (below, referred to as the "amount of accelerator depression"), etc. are input through corresponding AD converters 207.

At the output port 206, the hydrogen feed control part 23 (main check valve 231, regulator 232, and injector 233) and the hydrogen recirculation pump 27, purge control valve 29, compressor 33, cathode inlet valve 35, distribution valve 37, cathode pressure control valve 39, first converter 51, circuit breaker 52, second converter 54, inverter 56, and other control parts are electrically connected through corresponding drive circuits 208.

The electronic control unit 200 outputs control signals from the output port 206 for controlling the control parts based on the output signals of various sensors input to the input port 205 so as to control the fuel cell system 100. Below, the control of the fuel cell system 100 which the electronic control unit 200 performs, in particular the rapid warmup control of the fuel cell system 100, will be explained.

Figure 2:
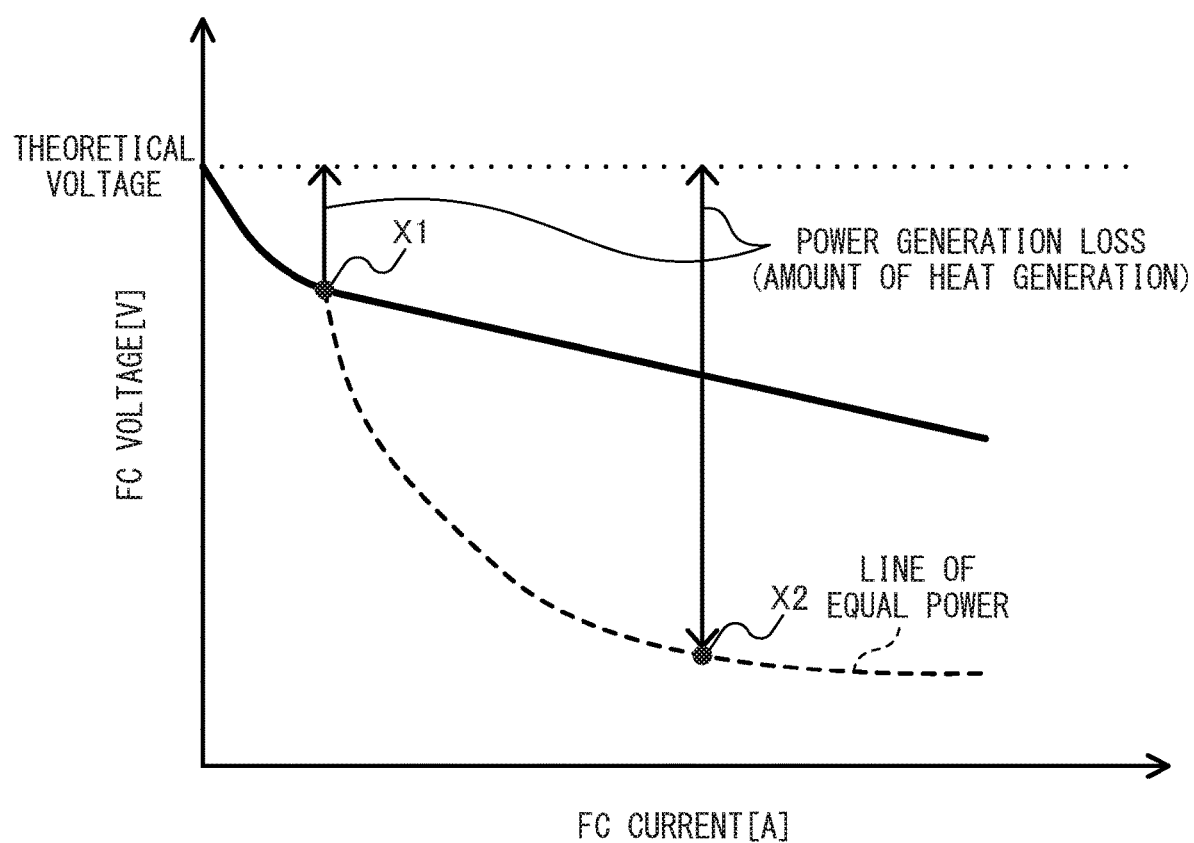
FIG. 2 is a view showing a standard IV characteristic of a fuel cell stack when an FC temperature is a certain temperature.

FIG. 2 is a view showing a current-voltage characteristic serving as a standard for a fuel cell stack 10 when a stack temperature Tfc is a certain temperature (below, referred to as the "standard IV characteristic"). The standard IV characteristic is the IV characteristic when performing high efficiency power generation suppressing various types of power generation loss occurring at the time of power generation (normal power generation).

The electronic control unit 200 calculates the target generated electric power Ptg [kW] of the fuel cell stack 10 based on the operating state of the fuel cell system 100. In the present embodiment, the electronic control unit 200 calculates the total value of requested electric power of the motor-generator 55 calculated based on the amount of accelerator depression etc. and the requested electric powers of the compressor 33 and other auxiliaries as the target generated electric power Ptg.

Further, as shown in FIG. 2, at the time of normal operation performing high efficiency power generation after the fuel cell stack 10 finishes warming up, the electronic control unit 200 controls the air stoichiometric ratio and in turn the FC air feed quantity Qfc so that the operating point X defined by the FC current Ifc and FC voltage Vfc becomes a normal operating point X1 able to generate the target generated electric power Ptg on the standard IV characteristic.

The "air stoichiometric ratio" is the ratio of the actual FC air feed quantity Qfc with respect to the minimum FC air feed quantity Qst required for generating the target generated electric power Ptg (below, referred to as the "stoichiometric FC air feed quantity"). Therefore, as the air stoichiometric ratio (=Qfc/Qst) becomes greater than 1.0, the actual FC air feed quantity Qfc becomes greater than the stoichiometric FC air feed quantity Qst.

Figure 3:
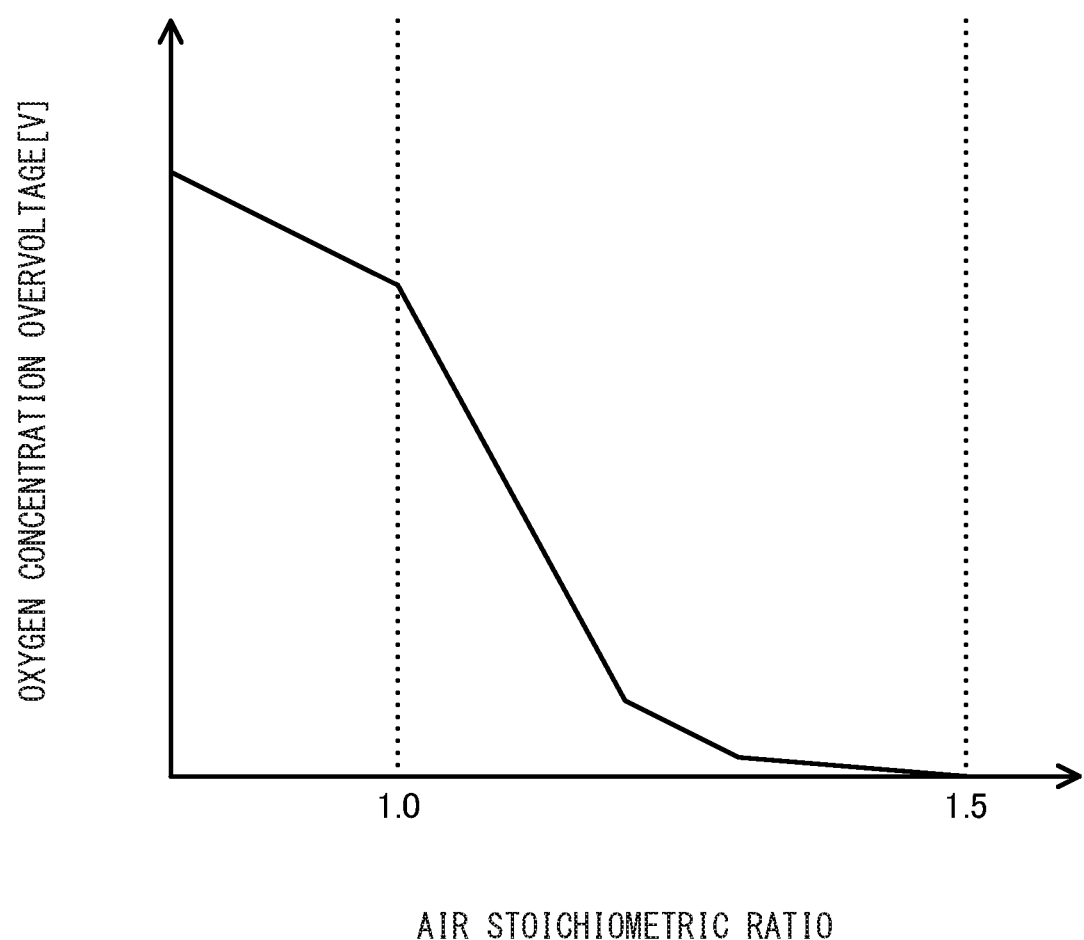
FIG. 3 is a view explaining a relationship of an air stoichiometric ratio and oxygen concentration overvoltage of one factor of power generation loss.

FIG. 3 is a view explaining a relationship of an air stoichiometric ratio and oxygen concentration overvoltage of one factor of power generation loss (power generator loss occurring due to insufficient oxygen at time of power generation).

As shown in FIG. 3, the oxygen concentration overvoltage tends to become larger when the air stoichiometric ratio is small compared to when it is large. In other words, the power generation loss due to the oxygen concentration overvoltage (amount of voltage drop) tends to become larger when the air stoichiometric ratio is small compared to when it is large.

Therefore, at the time of normal operation, the electronic control unit 200 controls the FC air feed quantity Qfc so that the air stoichiometric ratio becomes an air stoichiometric ratio in a normal region where the oxygen concentration overvoltage can be substantially ignored (in the example shown in FIG. 3, for example, an air stoichiometric ratio near 1.5) so as to perform high efficiency power generation kept down in power generation loss.

On the other hand, when starting up and operating a fuel cell system 100 in an environment below the freezing point, the electronic control unit 200 performs a rapid warmup operation so as to keep the water generated along with power generation from freezing while enabling the IV characteristic, which worsens the lower the temperature at the time, to be quickly restored. A rapid warmup operation is a method of operation in which the FC air feed quantity Qfc is controlled to make the oxygen concentration overvoltage increase from the time of normal operation to intentionally make the power generation loss increase and thereby make the amount of self heat generation of the fuel cell stack 10 increase to promote warmup.

At the time of a rapid warmup operation, the electronic control unit 200 controls the FC air feed quantity Qfc so that the air stoichiometric ratio becomes an air stoichiometric ratio in a rapid warmup region where the oxygen concentration overvoltage can no longer be ignored (in the example shown in FIG. 3, for example, an air stoichiometric ratio near 1.0) so as to perform low efficiency power generation generating the target generated electric power Ptg while making the power generation loss (amount of self heat generation) increase over normal operation.

Due to this, compared with the case in FIG. 2 of performing high efficiency power generation on the standard IV characteristic, it is possible to make the FC voltage Vfc drop by exactly the amount of the oxygen concentration overvoltage corresponding to the air stoichiometric ratio. That is, by controlling the FC current Ifc while suitably controlling the air stoichiometric ratio and in turn the FC air feed quantity Qfc, as shown in FIG. 2, it is possible to generate electric power at the normal operating point X1 and the rapid warmup operating point X2 where the power generation loss is made to increase from the normal operating point X1 and giving the desired amount of self heat generation on the line of equal power (see broken line), so it is possible to promote warmup of the fuel cell stack 10.

Here, as a result of intensive research by the inventors, it was learned that during this rapid warmup operation, sometimes a unit cell becoming a negative voltage arises. If a unit cell becoming a negative voltage arises, the unit cell and in turn the fuel cell stack 10 are liable to be made to deteriorate, so it is necessary to devise measures so that no unit cell becomes a negative voltage during the rapid warmup operation. Below, referring to FIG. 4, first the cause behind a unit cell becoming a negative voltage during a rapid warmup operation will be explained.

Figure 4:
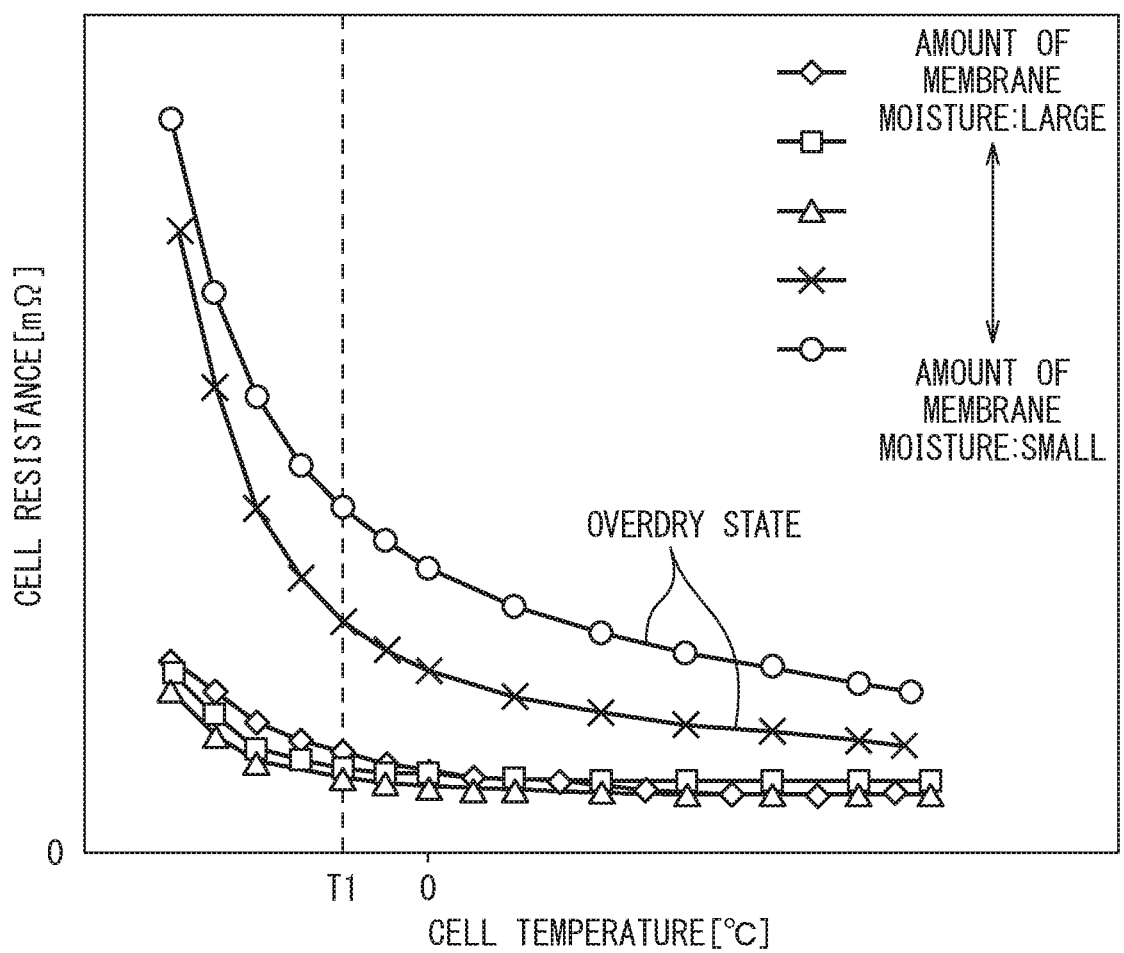
FIG. 4 is a view showing a relationship of a temperature of a unit cell and a resistance of that unit cell in accordance with an amount of water of an electrolytic membrane of that unit cell.

FIG. 4 is a view showing a relationship of a temperature of a unit cell (below, referred to as the "cell temperature") and a resistance of that unit cell (below, referred to as the "cell resistance") in accordance with an amount of water of an electrolytic membrane of that unit cell (below, referred to as the "amount of membrane water").

As shown in FIG. 4, the cell resistance increases as the cell temperature becomes lower and, if the amount of membrane water becomes smaller than a certain constant amount, tends to increase as the amount of membrane water becomes smaller. Further, in the region where the cell temperature is less than a predetermined temperature T1 of equal to or less than the freezing point, if the amount of membrane water is smaller than a certain constant amount, the cell resistance remarkably increases. In the following explanation, if a unit cell is in an overdried state, this shall indicate the state where the amount of membrane water of that unit cell is smaller than this certain constant amount.

The resistance overvoltage of the unit cell at the time of power generation becomes larger proportional to the increase of the cell resistance of that unit cell and becomes larger proportional to the increase of the output current of that unit cell. Further, as will be understood from the state of the line of equal electric power of the above-mentioned FIG. 2, if the generated electric power is the same, the larger the power generation loss (amount of self heat generation), the larger the FC current Ifc.

Therefore, if low efficiency power generation is performed when the FC temperature Tfc is less than the predetermined temperature T1 in a state where there is a unit cell in an overdried state, the cell resistance of the unit cell in an overdried state becomes extremely large and the voltage of that unit cell (below, referred to as the "cell voltage") greatly falls. As a result, the cell voltage of the unit cell in an overdried state may become a negative voltage. That is, the unit cell is believed to become a negative voltage during a rapid warmup operation due to low efficiency power generation being performed when the FC temperature Tfc is less than the predetermined temperature T1 in a state where there is the unit cell in an overdried state.

Therefore, in the present embodiment, when the FC temperature Tfc at the time of system startup is less than the predetermined temperature T1, it was decided to perform first low efficiency power generation kept down in power generation loss (amount of self heat generation) from normal low efficiency power generation (later explained second low efficiency power generation) until the amount of generated water produced along with power generation reaches a predetermined amount. The predetermined amount is made an amount of generated water enabling judgment of an overdried state being eliminated even if a certain unit cell is in an overdried state.

Due to this, even if a certain unit cell was in an overdried state, it is possible to keep the FC current Ifc low until the generated water produced along with power generation causes the overdried state of that unit cell to be resolved, so it is possible to reduce the resistance overvoltage. For this reason, it is possible to keep the unit cell from becoming a negative voltage.

Further, it was decided to perform second low efficiency power generation of normal low efficiency power generation made to increase in power generation loss (amount of self heat generation) over the first low efficiency power generation to promote warmup of the fuel cell stack 10 if the amount of generated water becomes equal to or greater than a predetermined amount.

Figure 5:
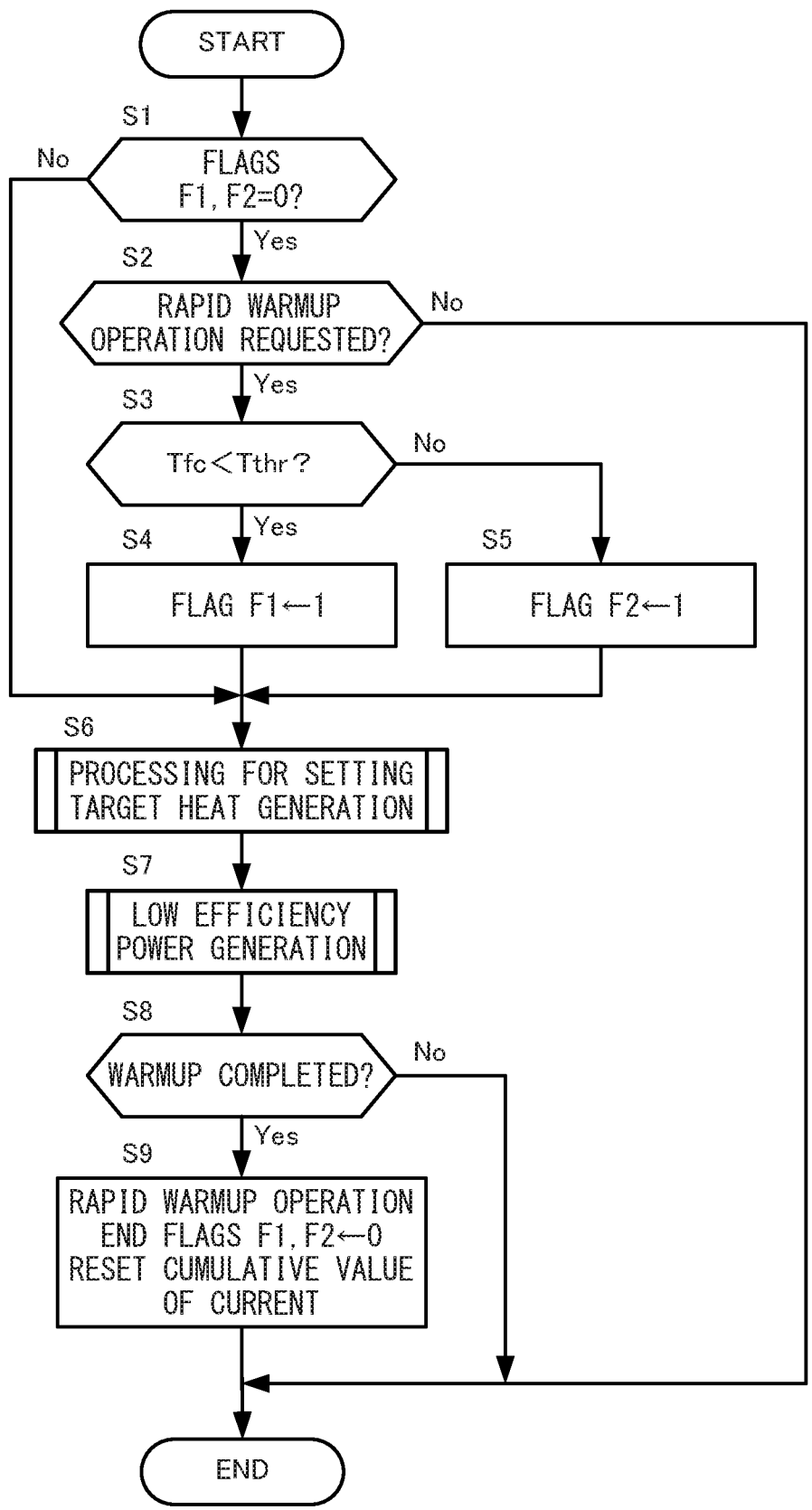
FIG. 5 is a flow chart explaining rapid warmup control of the fuel cell system according to the first embodiment of the present disclosure.

FIG. 5 is a flow chart explaining rapid warmup control of the fuel cell system 100 according to the present embodiment. The electronic control unit 200 repeatedly performs the present routine by a predetermined processing period (for example, 10 ms).

At step S1, the electronic control unit 200 judges if a first flag F1 and a second flag F2 have respectively been set to 0. The first flag F1 is a flag which is set to 1 when the above-mentioned first low efficiency power generation is being performed during a rapid warmup operation. The initial value is set to 0. The second flag F2 is a flag which is set to 1 when the above-mentioned second low efficiency power generation is being performed. The initial value is set to 0. If the first flag F1 and the second flag F2 are respectively set to 0, the electronic control unit 200 proceeds to the processing of step S2. On the other hand, if the first flag F1 or the second flag F2 is set to 1, the electronic control unit 200 proceeds to the processing of step S6.

At step S2, the electronic control unit 200 judges if there is a request for a rapid warmup operation. In the present embodiment, if the FC temperature at the time of system startup is equal to or less than a predetermined rapid warmup request temperature (for example 0° C.), the electronic control unit 200 judges that there is a request for a rapid warmup operation. When it judges that there is a request for a rapid warmup operation, the electronic control unit 200 proceeds to the processing of step S3. On the other hand, when it judges that there is no request for a rapid warmup operation, the electronic control unit 200 ends the current processing.

At step S3, the electronic control unit 200 determines whether to perform the first low efficiency power generation then perform the second resistivity power generation when there is a request for a rapid warmup operation or to not perform the first low efficiency power generation and to perform the second low efficiency power generation from the start. In the present embodiment, the electronic control unit 200 compares the FC temperature Tfc at the time of system startup with a predetermined standard temperature Tthr to thereby determine whether to perform the first low efficiency power generation then perform the second resistivity power generation or to not perform the first low efficiency power generation and to perform the second low efficiency power generation from the start. In the present embodiment, the standard temperature Tthr is made the above-mentioned predetermined temperature T1 with reference to FIG. 4.

If the FC temperature Tfc at the time of system startup is less than the standard temperature Tthr, the electronic control unit 200 proceeds to the processing of step S4 so as to perform the first low efficiency power generation then perform the second resistivity power generation. On the other hand, if the FC temperature Tfc at the time of system startup is equal to or greater than the standard temperature Tthr, even if there is a unit cell in the overdried state, the electronic control unit 200 judges that the increase in the cell resistance of that unit cell is in an allowable range and not enough that the cell voltage of the unit cell becomes a negative voltage and proceeds to the processing of step S5 so as to perform the second low efficiency power generation from the time of system startup to promote warmup.

At step S4, the electronic control unit 200 sets the first flag F1 to 1 so as perform the first low efficiency power generation then perform the second resistivity power generation.

At step S5, the electronic control unit 200 sets the second flag F2 to 1 so as perform the second low efficiency power generation from the time of system startup.

Figure 6:
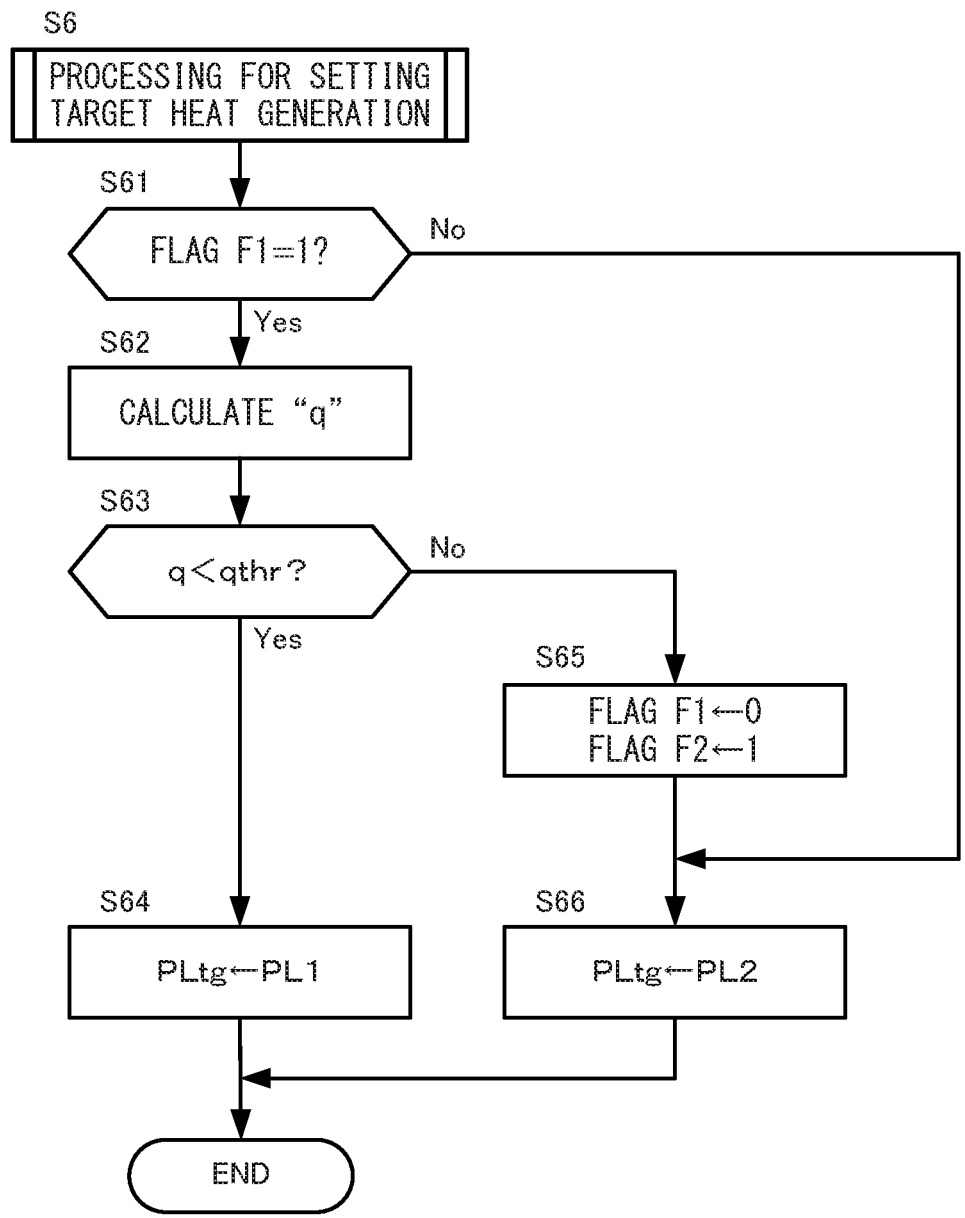
FIG. 6 is a flow chart explaining detailed processing for setting target heat generation.

At step S6, the electronic control unit 200 performs processing for setting a target amount of heat generation PLtg [kW] of the fuel cell stack 10 during a rapid warmup operation. Details of this processing for setting a target amount of heat generation will be explained with reference to the flow chart of FIG. 6.

At step S61, the electronic control unit 200 judges if the first flag F1 has been set to 1. If the first flag F1 has been set to 1, the electronic control unit 200 proceeds to the processing of step S62. On the other hand, if the first flag F1 is set to 0 (if the second flag F2 has been set to 1), the electronic control unit 200 proceeds to the processing of step S66.

At step S62, the electronic control unit 200 calculates, as a parameter in a correspondence relationship with the amount of generated water produced along with power generation, a cumulative value "q" [C] of the FC current Ifc from when the first low efficiency power generation is started (below, referred to as the "cumulative value of current").

At step S63, the electronic control unit 200 judges if the amount of generated water produced along with power generation has reached a predetermined amount. In the present embodiment, if the cumulative value of current "q" is less than the predetermined cumulative value qthr, the electronic control unit 200 judges that the amount of generated water produced along with power generation has still not reached the predetermined amount and proceeds to the processing of step S64. On the other hand, if the cumulative value of current "q" is equal to or greater than the predetermined cumulative value qthr, the electronic control unit 200 judges that the amount of generated water produced along with power generation has reached the predetermined amount and proceeds to the processing of step S65.

The predetermined cumulative value qthr is made the cumulative value of current enabling judgment of the overdried state of a unit cell being eliminated by generated water produced along with power generation even if a certain unit cell is in an overdried state at the time of startup of the fuel cell system 100.

At step S64, the electronic control unit 200 sets the target amount of heat generation PLtg to the first amount of heat generation PL1 (for example, 15 to 25 kW) so as to perform the first low efficiency power generation.

At step S65, the electronic control unit 200 returns the first flag F1 to 0 and sets the second flag F2 to 1 so as to switch from the first low efficiency power generation to the second low efficiency power generation.

At step S66, the electronic control unit 200 sets the target amount of heat generation PLtg to the second amount of heat generation PL2 larger than the first amount of heat generation PL1 (for example, 50 to 60 kW) to perform the second low efficiency power generation.

Returning to FIG. 5, at step S7, the electronic control unit 200 performs low efficiency power generation. The detailed processing at the time of low efficiency power generation will be explained later referring to FIG. 7.

At step S8, the electronic control unit 200 judges if warmup of the fuel cell stack 10 has been completed. In the present embodiment, the electronic control unit 200 judges if the FC temperature Tfc has become equal to or greater than a predetermined rapid warmup completion temperature (for example 70° C.). The electronic control unit 200 proceeds to the processing of step S9 if the FC temperature Tfc is equal to or greater than the rapid warmup completion temperature. On the other hand, the electronic control unit 200 ends the current processing if the FC temperature Tfc is less than the rapid warmup completion temperature.

At step S9, the electronic control unit 200 ends the rapid warmup operation, returns the first flag F1 and second flag F2 respectively to 0, and returns the value of the cumulative value of current "q" to zero.

Figure 7:
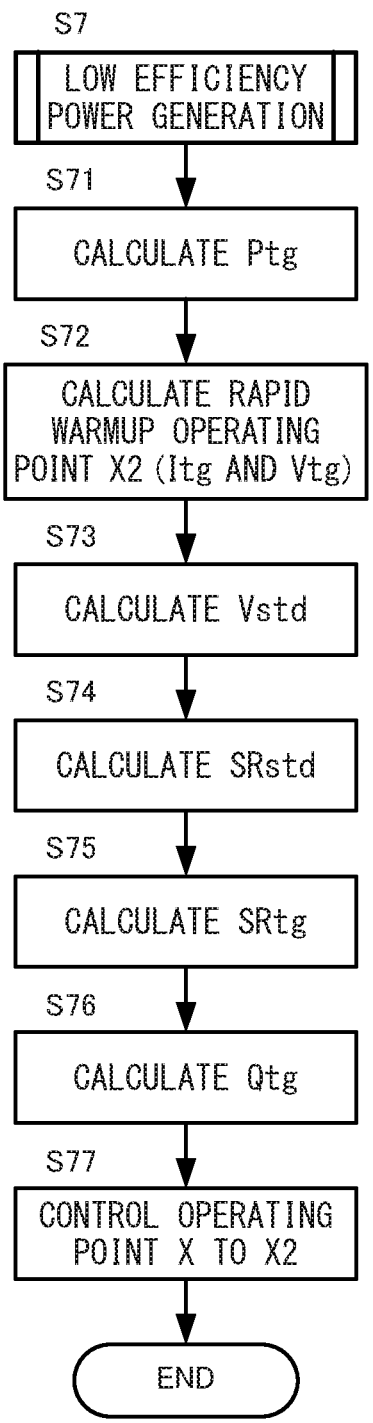
FIG. 7 is a flow chart explaining detailed processing of low efficiency power generation.

FIG. 7 is a flow chart explaining detailed processing at the time of low efficiency power generation.

At step S71, the electronic control unit 200 calculates the target generated electric power Ptg of the fuel cell stack 10 based on the operating state of the fuel cell system 100. In the present embodiment, the electronic control unit 200, as explained above, calculates the total value of the requested electric power of the motor-generator 55 and the requested electric power of a compressor 33 and other various auxiliaries as the target generated electric power Ptg.

Figure 8:
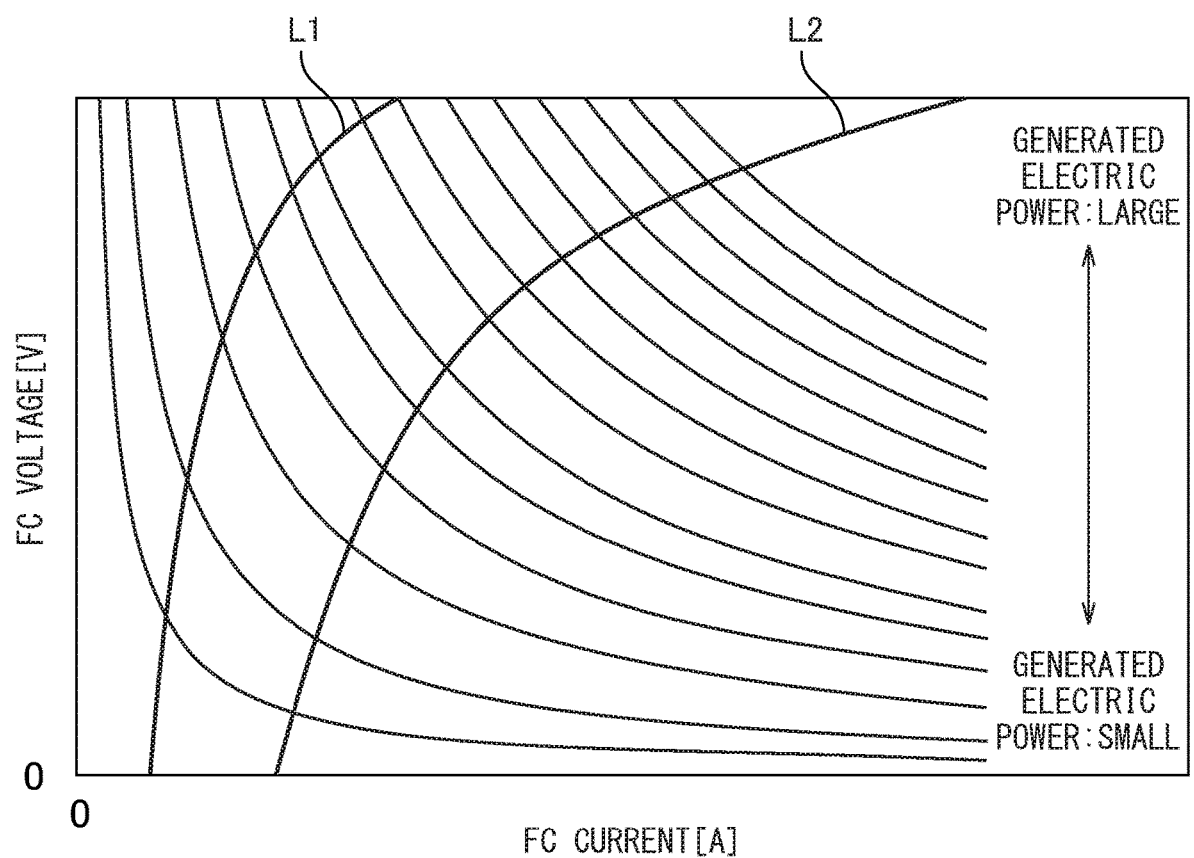
FIG. 8 is an IV characteristic map in which line of equal powers and lines of equal heat generation are drawn for calculating a rapid warmup operating point X2.

At step S72, the electronic control unit 200 refers to the IV characteristic map shown in FIG. 8 in which lines of equal power and lines of equal heat generation are drawn and calculates the rapid warmup operating point X2, that is, target FC current Itg [A] and target FC voltage Vtg [V], based on the target generated electric power Ptg and the target heat generation PLtg.

Figure 9:
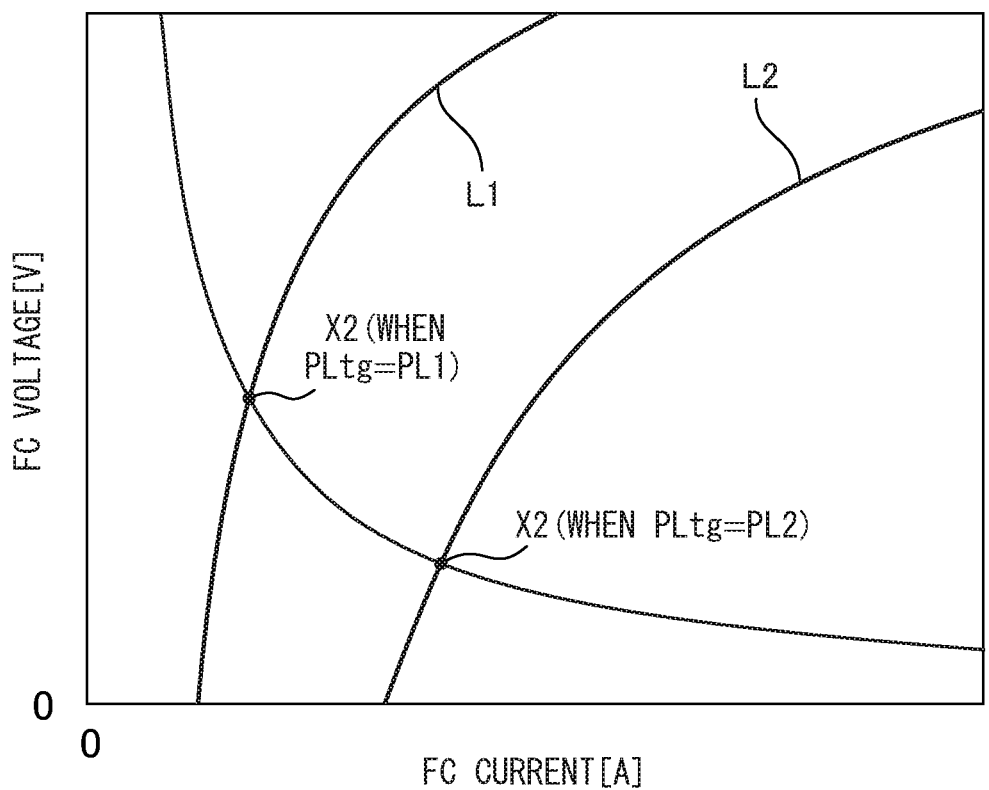
FIG. 9 is a view explaining a method of calculation of the rapid warmup operating point X2.

Specifically, the electronic control unit 200, as shown in FIG. 9, selects the line of equal power enabling generation of the target generated electric power Ptg from among the lines of equal power and calculates the point at which the selected line of equal power and line of equal heat generation enabling the amount of heat generation to be made the target heat generation PLtg on the IV characteristic map intersect as the rapid warmup operating point X2.

Note that in FIG. 8 and FIG. 9, the line of equal heat generation L1 is a line of equal heat generation enabling the amount of heat generation to be made a first amount of heat generation PL1, while the line of equal heat generation L2 is a line of equal heat generation enabling the amount of heat generation to be made a second amount of heat generation PL2.

Figure 10:
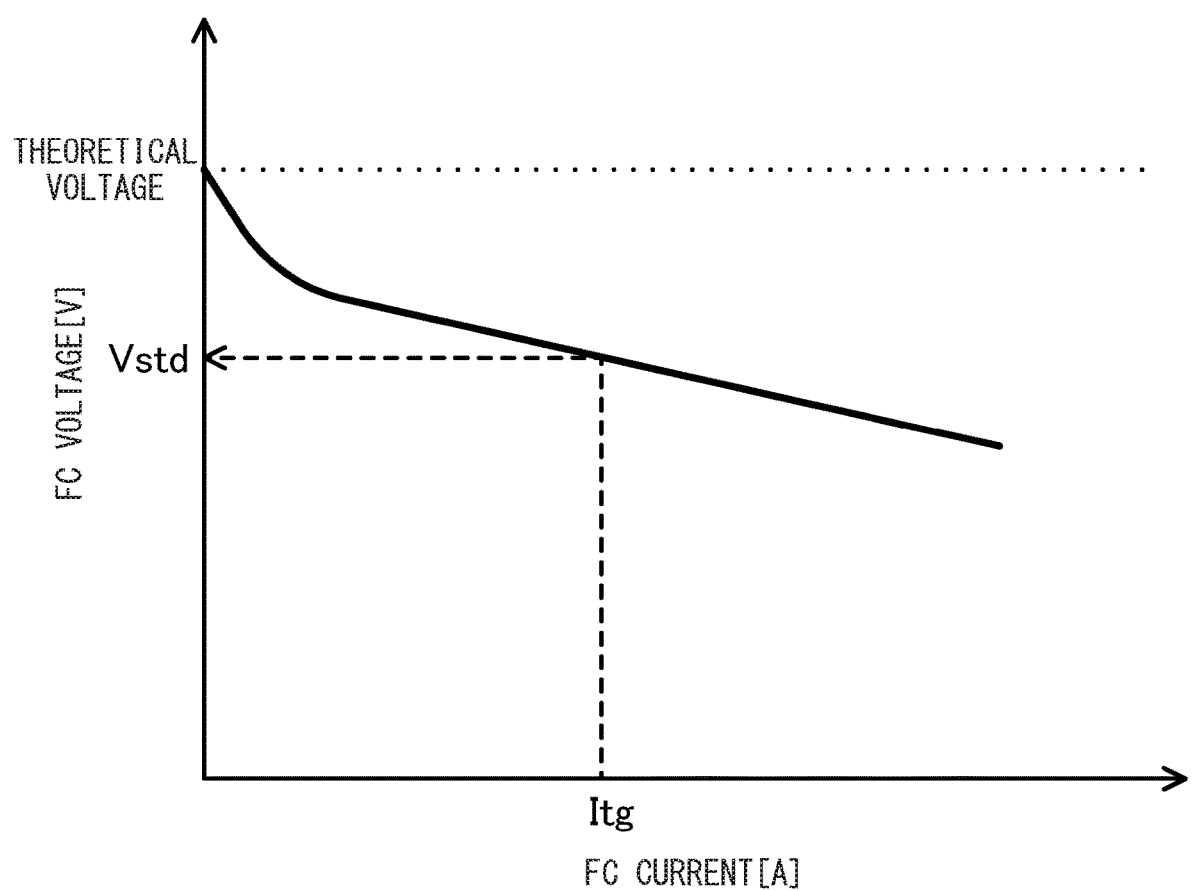
FIG. 10 is a standard IV characteristic map for calculating a standard FC voltage.

At step S73, the electronic control unit 200 refers to the standard IV characteristic map shown in FIG. 10 and calculates the FC voltage Vstd when controlling the FC current Ifc to the target FC current Itg on the standard IV characteristic (below, referred to as the "standard FC voltage"). In other words, the standard FC voltage Vstd is the FC voltage when performing high efficiency power generation (normal power generation) to control the FC current Ifc to the target FC current Itg.

Note that the standard IV characteristic changes according to the FC temperature Tfc, so a plurality of standard IV characteristic maps are prepared for different FC temperatures. Therefore, the electronic control unit 200 refers to the optimal standard IV characteristic map corresponding to the current FC temperature Tfc from among the plurality of standard IV characteristic maps and calculates the standard FC voltage Vstd.

Figure 11:
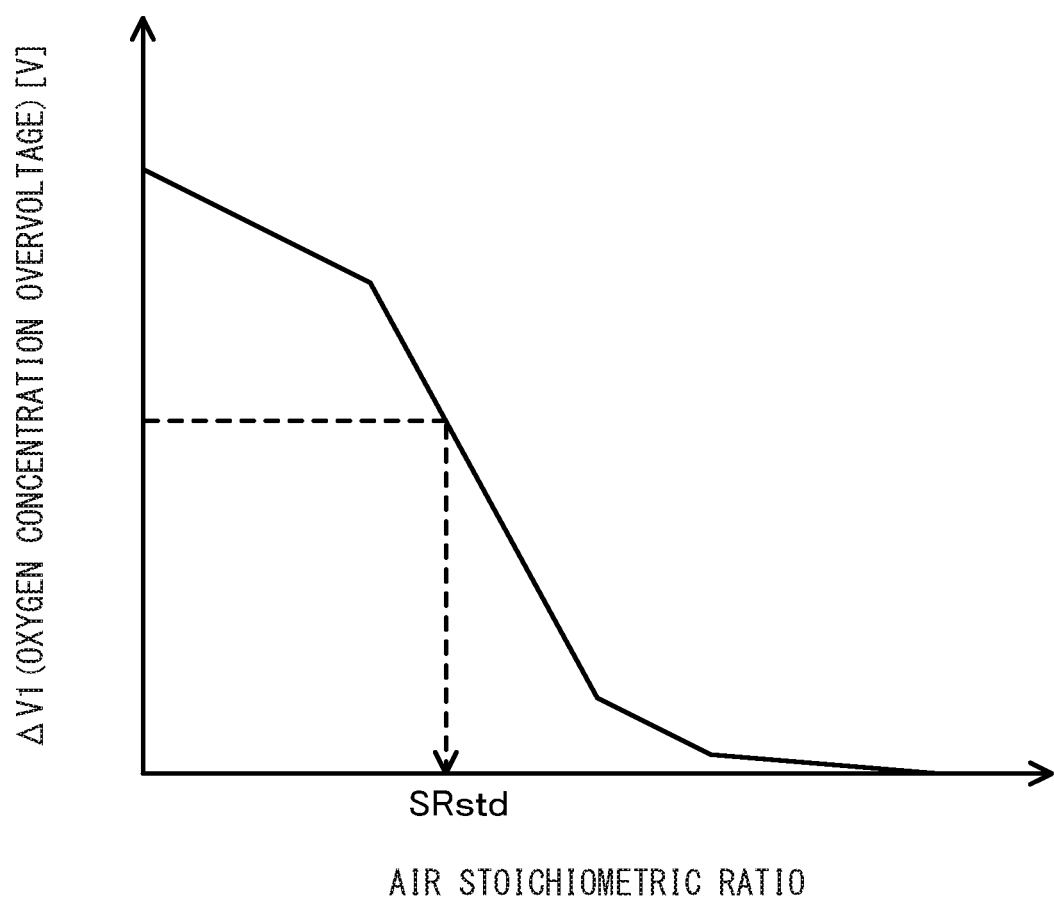
FIG. 11 is a map showing a relationship between the air stoichiometric ratio and the oxygen concentration overvoltage for calculating a standard air stoichiometric ratio.

At step S74, the electronic control unit 200 refers to the map showing the relationship between the air stoichiometric ratio and the oxygen concentration overvoltage shown in FIG. 11 similar to FIG. 3 and calculates the standard air stoichiometric ratio SRstd based on the difference $\Delta V1$ between the standard FC voltage Vstd and the target FC voltage Vtg (that is, the oxygen concentration overvoltage required to be caused for making the standard FC voltage Vstd fall to the target FC voltage Vtg) (=Vstd−Vtg).

At step S75, the electronic control unit 200 calculates a feedback correction value for the standard air stoichiometric ratio SRstd based on the difference $\Delta V2$ between the target FC voltage Vtg and FC voltage Vfc (below, referred to as the FC voltage difference") (=Vtg−Vfc) and adds the feedback correction value to the standard air stoichiometric ratio SRstd to thereby calculate the target air stoichiometric ratio SRtg.

At step S76, the electronic control unit 200 multiplies the stoichiometric FC air feed quantity Qth required for generating the target generated electric power Ptg with the target air stoichiometric ratio SRtg to thereby calculate the target FC air feed quantity Qtg.

At step S77, the electronic control unit 200 controls the control parts so that the operating point X defined by the FC current Ifc and FC voltage Vfc becomes the rapid warmup operating point X2.

Specifically, the electronic control unit 200 controls the first converter 51 to control the FC current Ifc to the target FC current Itg and control the FC air feed quantity Qfc to the target air feed quantity Qtg. At this time, the electronic control unit 200 controls the compressor 33 so that the total air feed quantity Qafc becomes constant and controls the opening degrees of the cathode inlet valve 35, distribution valve 37, and cathode pressure control valve 39 to thereby control the FC air feed quantity Qfc to the target air feed quantity Qtg.

Figure 12A:
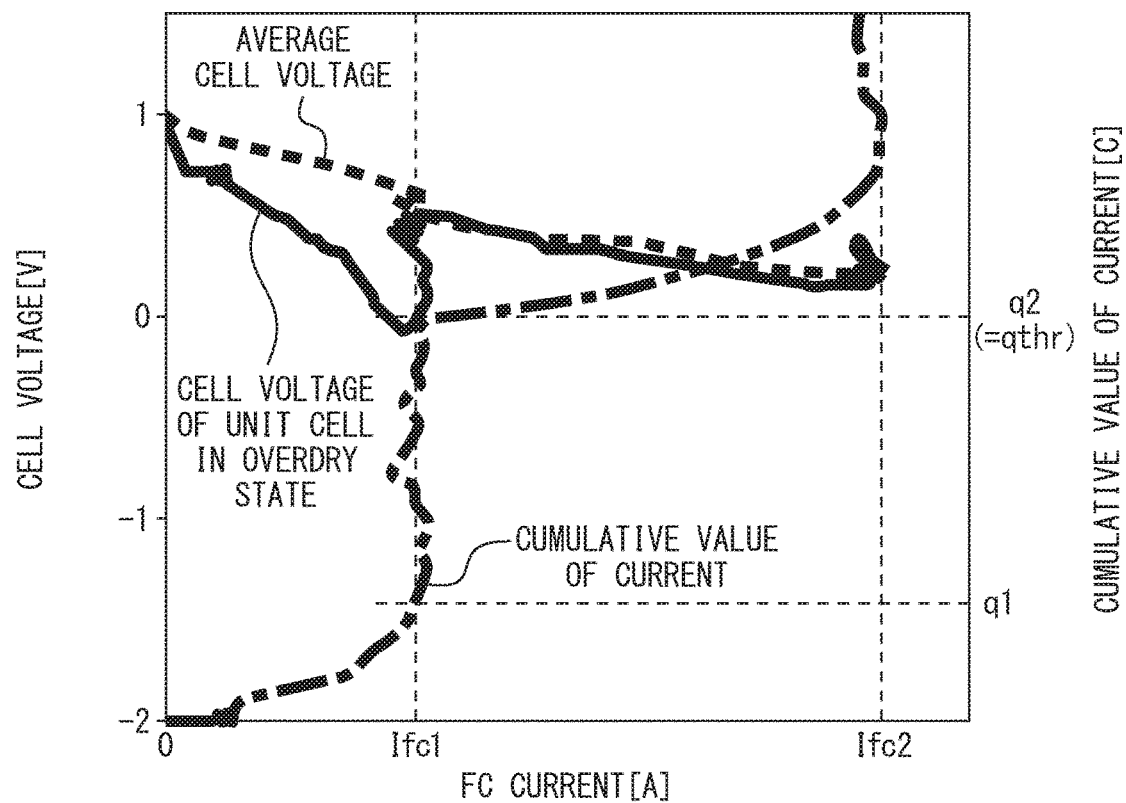
FIG. 12A is a view using the FC current as the abscissa showing changes along with time of a cell voltage of a unit cell in an overdried state, an average cell voltage of a fuel cell stack, and a cumulative value of current when performing rapid warmup control according to the present embodiment.
Figure 12B:
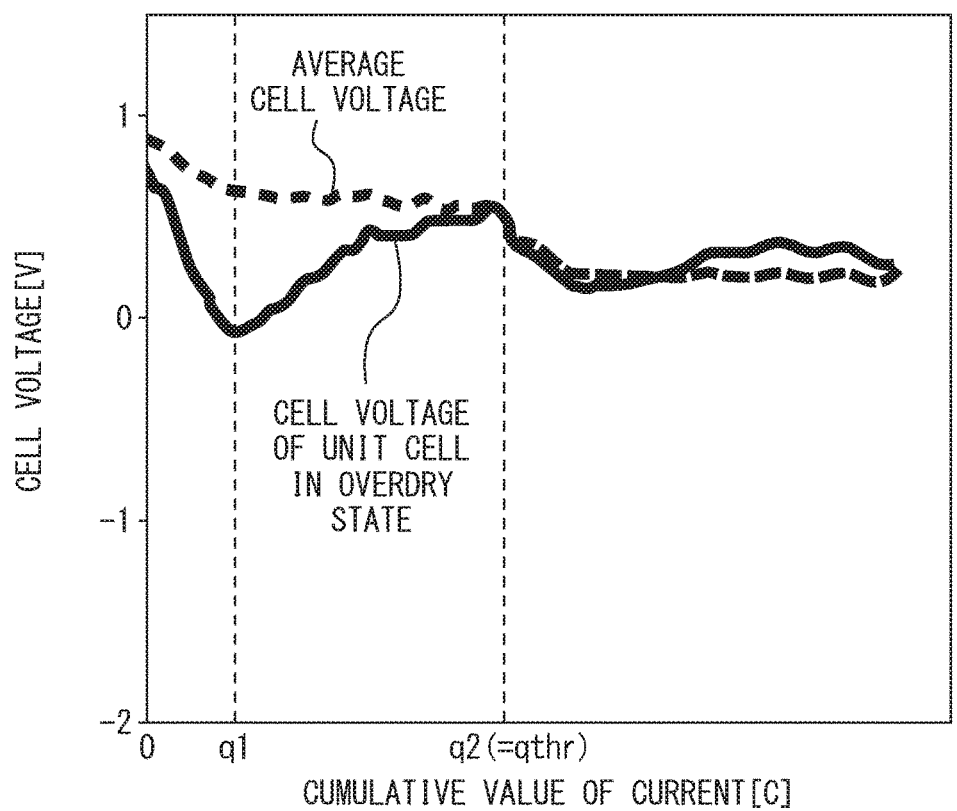
FIG. 12B is a view using the cumulative value of current as the abscissa showing changes along with time of a cell voltage of a unit cell in an overdried state and an average cell voltage of a fuel cell stack 10 when performing rapid warmup control according to the present embodiment.

FIG. 12A and FIG. 12B are views explaining the actions and effects when performing rapid warmup control according to the respective embodiments.

FIG. 12A is a view using the FC current as the abscissa showing changes along with time of a cell voltage of a unit cell in an overdried state (see solid line), an average cell voltage of a fuel cell stack 10 (see broken line), and a cumulative value of current "q" (see one dot chain line) when performing rapid warmup control according to the present embodiment. Note that, in FIG. 12A, the FC current Ifc1 is the target FC current when performing the first low efficiency power generation, that is, when setting the target amount of heat generation PLtg to the first amount of heat generation PL1. The FC current Ifc2 is the target FC current when performing the second low efficiency power generation, that is, when setting the target amount of heat generation PLtg to the second amount of heat generation PL2.

As shown in FIG. 12A, if the first low efficiency power generation is performed at the time of start of a rapid warmup operation, the FC current Ifc is made to increase up to the target FC current Ifc1 at the time of the first low efficiency power generation and the cumulative value of current "q" increases up to the first cumulative value q1. The cell voltage of a unit cell in the overdried state falls along with an increase of the FC current Ifc, but the target FC current Ifc1 at the time of the first low efficiency power generation becomes smaller than the target FC current Ifc2 at the time of the second low efficiency power generation, so it is possible to keep down the resistance overvoltage and keep the reduction in the cell voltage of the unit cell in the overdried state to generally down to near 0[V].

Further, due to the generated water produced in the time period in which the first low efficiency power generation is being performed (time period in which FC current Ifc is controlled to Ifc1), the amount of membrane water of a unit cell in the overdried state gradually increases and due to this the resistance overvoltage of the unit cell in the overdried state gradually falls, so the cell voltage of the unit cell in the overdried state gradually is restored (increases).

Further, if the cumulative value of current "q" of the time period during which the first low efficiency power generation is being performed reaches the second cumulative value q2 and the cell voltage of a unit cell in the overdried state is restored (increases) to become equal to the average cell voltage of the fuel cell stack 10, the FC current Ifc is made to increase to the target FC current Ifc2 at the time of the second low efficiency power generation and warmup is promoted.

In the present embodiment, this second cumulative value q2 is made a predetermined cumulative value qthr for judging whether the amount of generated water produced along with power generation has reached a predetermined amount, that is, a predetermined cumulative value qthr enabling judgment of the overdried state of a unit cell being resolved by generated water produced along with power generation even if a certain unit cell was in an overdried state at the time of system startup.

FIG. 12B is a view using the cumulative value of current as the abscissa showing changes along with time of a cell voltage of a unit cell in an overdried state and an average cell voltage of a fuel cell stack 10 when performing rapid warmup control according to the present embodiment.

As shown in FIG. 12B, until the cumulative value of current "q" becomes a first cumulative value q1, that is, until the first low efficiency power generation is performed at the time of start of a rapid warmup operation and the FC current Ifc is made to increase to the target FC current Ifc1 at the time of the first low efficiency power generation, the cell voltage of the unit cell in the overdried state falls along with an increase of the FC current Ifc.

Further, while the cumulative value of current "q" is a range from the first cumulative value q1 to the second cumulative value q2, due to the generated water produced at the time of the first low efficiency power generation, the amount of membrane water of a unit cell in the overdried state gradually increases and thereby the resistance overvoltage of the unit cell in the overdried state gradually falls, so the cell voltage of the unit cell in the overdried state gradually is restored (increases).

Further, if the cumulative value of current "q" becomes the second cumulative value q2, the cell voltage of a unit cell in the overdried state is restored (increases) to become equal to the average cell voltage of the fuel cell stack 10.

Note that as explained above, in the present embodiment, the second cumulative value q2 is made a predetermined cumulative value qthr. The second cumulative value q2, in other words, is a cumulative value of current enabling judgment of an overdried state of a unit cell in an overdried state being completely eliminated by generated water produced along with power generation even if there is such a unit cell.

However, the disclosure is not limited to this. It is also possible to set any cumulative value of current between the first cumulative value q1 to the second cumulative value q2 as the predetermined cumulative value qthr and perform the second low efficiency power generation at the point of time when the overdried state is resolved to a certain extent. Note that in the case of a unit cell with an electrode area of 200 $cm^2$ to 400 $cm^2$, the first cumulative value q1 was about 100 C and the second cumulative value q2 was about 400 C.

Further, in the present embodiment, the predetermined cumulative value qthr had been fixed to the second cumulative value q2, but it may also be made a variable value. For example, when the FC temperature Tfc at the time of system startup is relatively high, the FC temperature Tfc may rise early to a temperature where the cell resistance of a unit cell in the overdried state becomes an allowable range (for example, a temperature of at least equal to or greater than 0° C.) before the cumulative value of current "q" reaches the predetermined cumulative value qthr. In such a case, even if performing the second low efficiency power generation at the point of time when the FC temperature Tfc reaches a temperature where the cell resistance of a unit cell in the overdried state becomes an allowable range, it is possible to keep the cell voltage of the unit cell in the overdried state from becoming a negative voltage. Therefore, it is also possible to make the predetermined cumulative value qthr a variable value corresponding to the FC temperature Tfc at the time of system startup so that the predetermined cumulative value qthr becomes smaller when the FC temperature Tfc at the time of system startup is high compared to when it is low.

The fuel cell system 100 according to the present embodiment explained above is provided with a fuel cell stack 10 (fuel cell) generating electric power by electrochemical reactions between a fuel gas and an oxidizing agent gas and with an electronic control unit 200 (control device). The electronic control unit 200 is provided with a low efficiency power generation part performing low efficiency power generation with a power generation loss greater compared with normal power generation.

Further, the low efficiency power generation part is configured so that when the FC temperature Tfc at the time of start of power generation by the fuel cell stack 10 is less than the standard temperature Tthr, it makes the fuel cell stack 10 generate power so that the amount of heat generation of the fuel cell stack 10 accompanying power generation loss becomes a first amount of heat generation PL1. Further, the low efficiency power generation part is configured so that when the cumulative value of current "q" in the time period during which the fuel cell stack 10 is made to generate power so that the amount of heat generation of the fuel cell stack 10 accompanying power generation loss becomes the first amount of heat generation PL1 has become equal to or greater than a predetermined cumulative value qthr it makes the fuel cell stack 10 generate power so that the amount of heat generation becomes a second amount of heat generation PL2 greater than the first amount of heat generation PL1.

In the present embodiment, the standard temperature Tthr is made the predetermined temperature T1. The predetermined temperature T1 is a temperature at which the increase in the resistance value of a unit cell in the overdried state where the amount of water of the electrolytic membrane is smaller than a predetermined amount becomes more remarkable compared with when the FC temperature Tfc becomes equal to or greater than the predetermined temperature T1 if the FC temperature Tfc becomes less than the predetermined temperature T1. Further, the predetermined cumulative value qthr is a value where the amount of generated water from the time of start of power generation of the fuel cell stack 10 produced along with power generation of the fuel cell stack 10 becomes equal to or greater than a predetermined amount.

Due to this, when the FC temperature Tfc is less than the predetermined temperature T1 at which the cell resistance of a unit cell in the overdried state starts to remarkably increase, even if there had been a unit cell in the overdried state present, it is possible to perform the first low efficiency power generation keeping down the amount of heat generation to the first amount of heat generation PL1 until the amount of generated water becomes equal to or greater than a predetermined amount and the overdried state of that unit cell is resolved. That is, even if there had been a unit cell in the overdried state present, it is possible to keep low the FC current Ifc during power generation until the amount of generated water becomes equal to or greater than a predetermined amount and the overdried state of the unit cell is resolved. For this reason, even if there had been a unit cell in the overdried state present, it is possible to reduce the resistance overvoltage of that unit cell. Therefore, even if there had been a unit cell in the overdried state present, it is possible to keep the unit cell from becoming a negative voltage during a rapid warmup operation.

Second Embodiment

Next, a second embodiment of the present disclosure will be explained. The present embodiment differs from the first embodiment on the point of performing the first low efficiency power generation at the time of start of a rapid warmup operation or making variable the standard temperature Tfc for judging whether to perform the second low efficiency power generation without performing the first low efficiency power generation. Below, the explanation will be given focusing on this point of difference.

Figure 13:
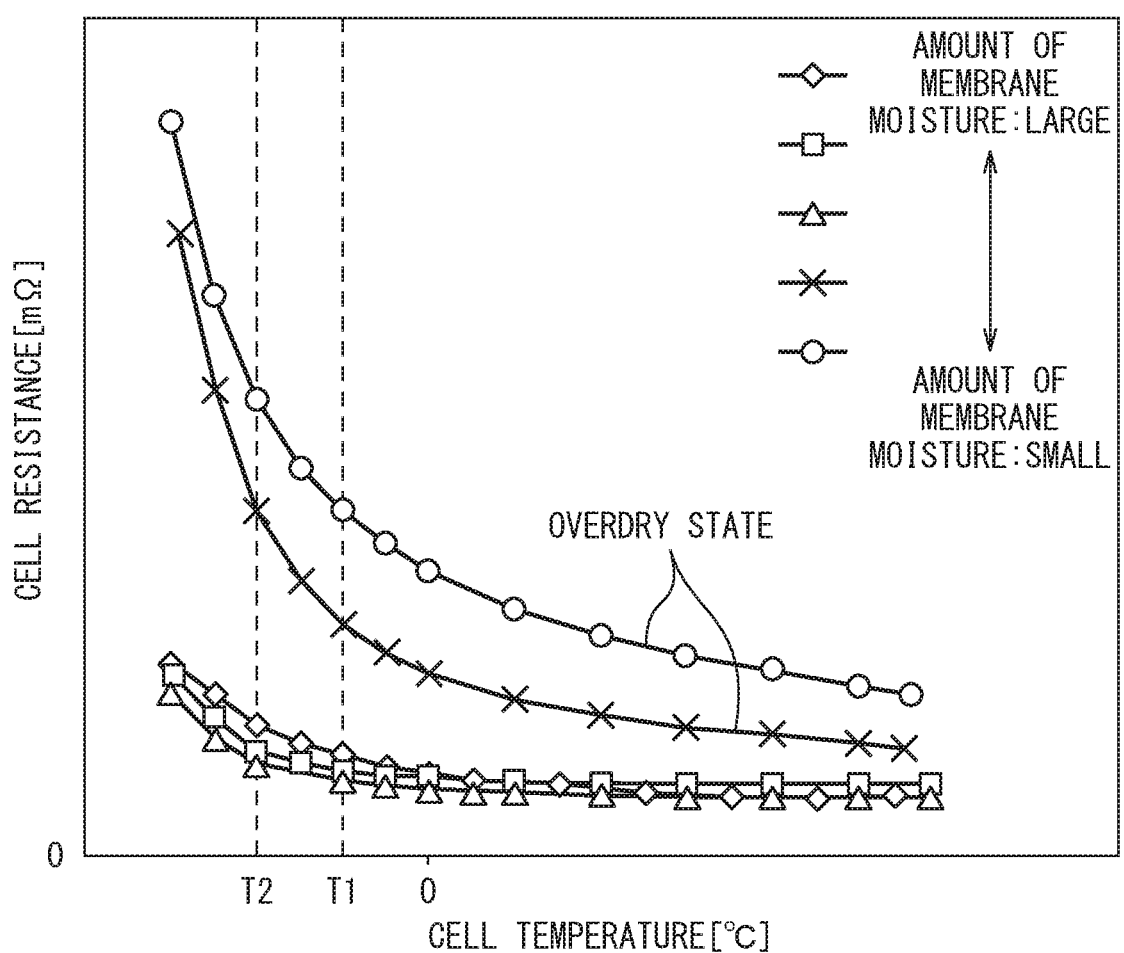
FIG. 13, similar to FIG. 4, is a view showing a relationship of a temperature of a unit cell and a resistance of that unit cell in accordance with an amount of water of an electrolytic membrane of that unit cell.

FIG. 13 is a view similar to FIG. 4 and is a view showing a relationship of the cell temperature of a unit cell and the cell resistance of that unit cell in accordance with an amount of membrane water of that unit cell.

In the above-mentioned first embodiment, the predetermined temperature T1 at which the cell resistance of a unit cell in the overdried state starts to remarkably increase was set as the standard temperature Tfc regardless of whether there is a unit cell in the overdried state actually present at the time of start of a rapid warmup operation predicated on there being a unit cell in the overdried state present.

However, if able to judge that there is no unit cell in the overdried state at the time of starting a rapid warmup operation, for example, as shown in FIG. 13, it is possible to lower the standard temperature Tfc down to a predetermined temperature T2 at which the cell resistance of a unit cell in a wet state not the overdried state starts to increase. If possible to lower the standard temperature Tfc, it is possible to increase the opportunities for being able to perform the second low efficiency power generation from the time of start of a rapid warmup operation. By performing the second low efficiency power generation from the time of start of a rapid warmup operation, it is possible to shorten the time until the completion of warmup (warmup time) compared with when performing the first low efficiency power generation then performing the second low efficiency power generation. As a result, it is possible to increase the opportunities for being able to complete the warmup in a short time.

Here, if the liquid water produced during system operation remains as is inside the fuel cell stack 10 even after the system is stopped, the liquid water will freeze during the time period when the system is stopped and the power generation performance is liable to deteriorate at the time of system startup. For this reason, the electronic control unit 200 according to the present embodiment is configured to supply anode gas or cathode gas to the fuel cell stack 10 in accordance with need after stopping the system and to perform purging processing for discharging liquid water inside the fuel cell stack 10 to the outside.

Specifically, the electronic control unit 200 is configured to set a purging mode of the fuel cell system 100 to for example a first purging mode or a second purging mode in accordance with the average value of the lowest temperatures over the past few days and, when the purging mode is the first purging mode where the average value of the lowest temperatures over the past few days is higher than the freezing point (normal purging mode), purge the inside of the fuel cell stack 10 as an exception when generating power at the fuel cell stack 10 so long at the FC temperature Tfc during the time period when the system is stopped becomes equal to or less than the freezing point. Further, the electronic control unit 200 is configured so that when in a second purging mode set where the average value of the lowest temperatures over the past few days is equal to or less than the freezing point (winter purging mode), it always purges the inside of the fuel cell stack 10 in the state making the fuel cell stack 10 generate power at the time when the system is stopped.

Note that, the condition for switching the second purging mode is not limited to the above condition, so for example it is possible to switch to the second purging mode when during system operation the outside temperature becomes equal to or less than the freezing point for a certain time period or to switch to the second purging mode when the system shuts down if the outside temperature becomes equal to or less than the freezing point.

The purging processing which is performed when the purging mode is the first purging mode purges the inside of the fuel cell stack 10 for exactly a predetermined time set in advance without performing power generation, so sometimes a unit cell becomes an overdried state in accordance with the amounts of membrane water of the unit cells at the time the system is stopped. On the other hand, the purging processing which is performed when the purging mode is the second purging mode purges the inside of the fuel cell stack 10 so that the amounts of membrane water of the unit cells at the time the system is stopped become equal to or less than a predetermined amount while performing power generation, so basically there is no chance of a unit cell becoming an overdried state.

Therefore, in the present embodiment, when the purging mode is set to the first purging mode and the inside of the fuel cell stack 10 is purged during the time period when the system is stopped, there is a possibility of there being a unit cell in the overdried state, so in the same way as the first embodiment, it was decided to set the standard temperature Tthr to the predetermined temperature T1.

Further, when the purging mode is set to the second purging mode, the amount of membrane water is managed while the inside of the fuel cell stack 10 is always purged when the system is stopped. Due to this, as explained above, basically there is no chance of a unit cell becoming an overdried state, so it was decided to set the standard temperature to a predetermined temperature T2 lower than the predetermined temperature T1.

Figure 14:
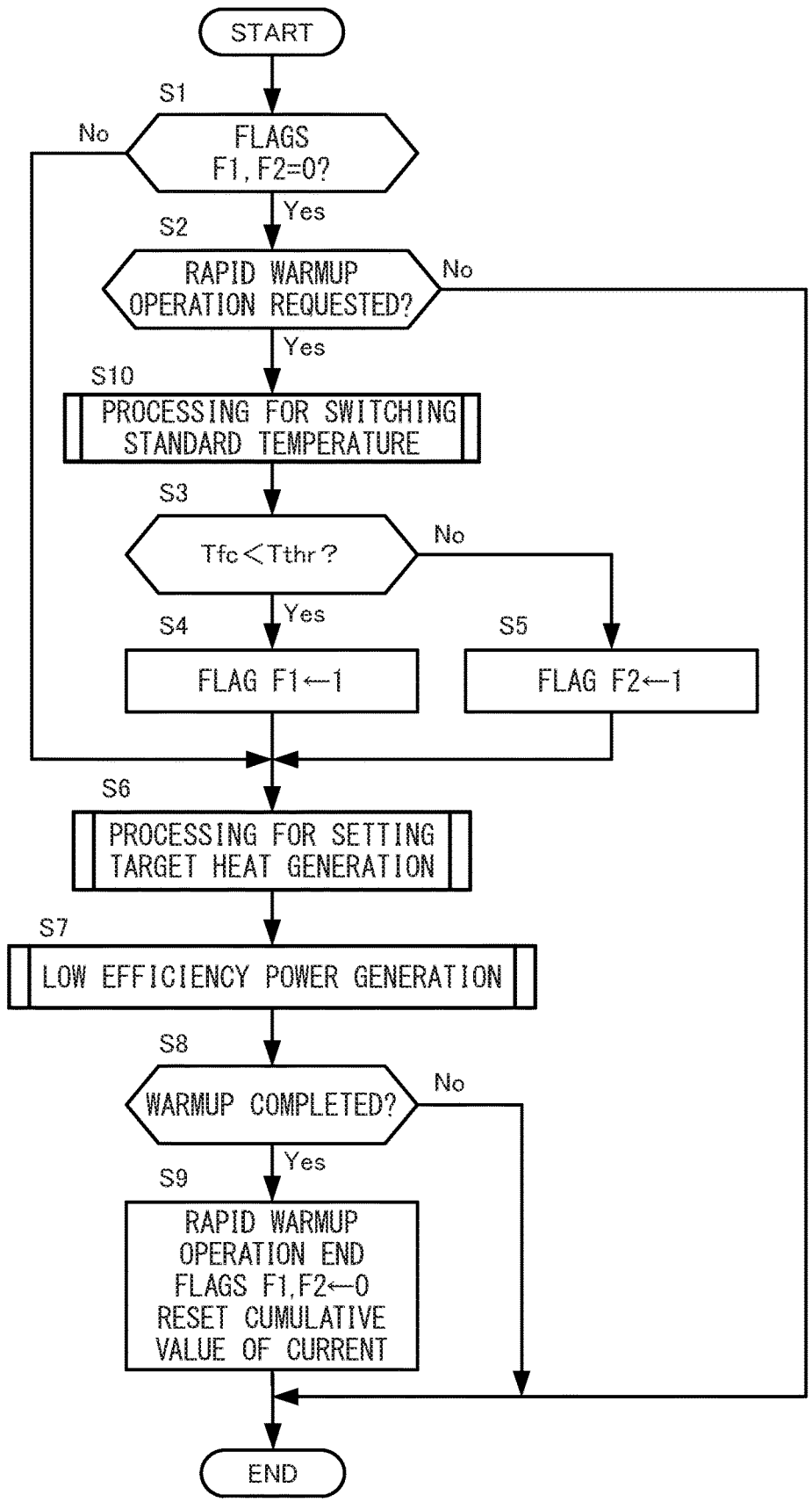
FIG. 14 is a flow chart explaining rapid warmup control of the fuel cell system accompanied according to a second embodiment of the present disclosure.

FIG. 14 is a flow chart explaining rapid warmup control according to the present embodiment. The electronic control unit 200 repeatedly performs the present routine by a predetermined processing period (for example, 10 ms). In FIG. 14, the content of the processing from step S1 to step S9 is the same as the content of the processing of the above-mentioned first embodiment, so the explanation will be omitted here.

At step S10, the electronic control unit 200 performs processing for switching the standard temperature. Details of the processing for switching the standard temperature will be explained with reference to FIG. 15.

FIG. 15 is a flow chart explaining the processing for switching the standard temperature.

At step S101, the electronic control unit 200 judges if the purging mode is the first purging mode or the second purging mode. The electronic control unit 200 proceeds to the processing of step S102 if the purging mode is the first purging mode. On the other hand, the electronic control unit 200 proceeds to the processing of step S104 if the purging mode is the second purging mode.

At step S102, the electronic control unit 200 judges if the inside of the fuel cell stack 10 has been purged during the time period when the system is stopped. If the inside of the fuel cell stack 10 has been purged during the time period when the system is stopped, the electronic control unit 200 proceeds to the processing of step S103. On the other hand, if the inside of the fuel cell stack 10 has not been purged during the time period when the system is stopped, the electronic control unit 200 proceeds to the processing of step S104.

At step S103, the electronic control unit 200 sets the standard temperature Tthr to a predetermined temperature T1. The predetermined temperature T1 is a temperature of for example around −10° C.

At step S104, the electronic control unit 200 sets the standard temperature Tthr to a predetermined temperature T2 lower than the predetermined temperature T1. The predetermined temperature T2 is a temperature of for example around −20° C.

According to the present embodiment explained above, the electronic control unit 200 is provided with, in addition to the above-mentioned low efficiency power generation part, a purging mode switching part switching the purging mode of the fuel cell stack 10 to the first purging mode or the second purging mode. The first purging mode is a purging mode purging the inside of the fuel cell stack 10 without allowing the fuel cell stack 10 to generate power so long as in the time period where the fuel cell system 100 is stopped when the FC temperature Tfc has become equal to or less than the freezing point. The second purging mode is a purging mode purging the inside of the fuel cell stack 10 when the fuel cell system 100 is stopped in a state where the fuel cell stack 10 is made to generate power.

Further, the low efficiency power generation part according to the present embodiment is configured to lower the standard temperature Tthr when the purging mode of the fuel cell stack 10 is the second purging mode compared with when the inside of the fuel cell stack 10 is purged in the case of the first purging mode.

The low efficiency power generation part more specifically is configured to set the standard temperature Tthr to a predetermined first temperature T1 if the purging mode is the first purging mode when the inside of the fuel cell stack 10 has been purged and to set the standard temperature Tthr to a predetermined second temperature T2 lower than the first temperature T1 if the purging mode is the second purging mode.

The first temperature T1 is a temperature at which the increase in the resistance value of a unit cell in the overdried state where the amount of water of the electrolytic membrane is smaller than a predetermined amount becomes more remarkable compared with when the FC temperature Tfc becomes equal to or greater than the first temperature T1 if the FC temperature Tfc becomes less than the first temperature T1. The second temperature T2 is a temperature at which the increase in the resistance value of a unit cell in a wet state where the amount of water of the electrolytic membrane is greater than a predetermined amount becomes more remarkable compared with when the FC temperature Tfc becomes equal to or greater than the second temperature T2 if the FC temperature Tfc becomes less than the second temperature T2.

In this way, in the present embodiment, if it can be judged at the time of start of a rapid warmup operation that there is no unit cell in the overdried state, the standard temperature Tthr can be lowered, so it is possible to increase the opportunities for being able to perform the second low efficiency power generation from the time of start of a rapid warmup operation. By performing the second low efficiency power generation from the time of start of a rapid warmup operation, it is possible to shorten the time until the completion of warmup (warmup time) compared with when performing the first low efficiency power generation then performing the second low efficiency power generation. As a result, it is possible to increase the opportunities for being able to complete the warmup in a short time.

Above, embodiments of the present disclosure were explained, but the above embodiments merely show part of the examples of application of the present disclosure and are not meant to limit the technical scope of the present disclosure to the specific constitutions of the above embodiments.

For example, in the above embodiments, the explanation was given with reference to the example of the case of the fuel cell system 100 being mounted in a vehicle, but the system may also be mounted in various types of moving bodies not limited to vehicles. Further, it may also be a stationary system.

The invention claimed is:

1. A fuel cell system comprising:
a fuel cell configured to generate electric power by electrochemical reactions between a fuel gas and an oxidizing agent gas; and
a control device, wherein
the control device further comprises a low efficiency power generation part configured to perform low efficiency power generation with a power generation loss larger than a power generation loss during normal power generation, and wherein
the low efficiency power generation part is configured so that
when a temperature of the fuel cell at the time of start of power generation of the fuel cell is less than a standard temperature, it makes the fuel cell generate power so that the amount of heat generation of the fuel cell accompanying the power generation loss becomes a first amount of heat generation and so that
when a cumulative value of current of a time period during which the fuel cell is made to generate power so that the amount of heat generation becomes the first amount of heat generation is equal to or greater than a predetermined cumulative value, it makes the fuel cell generate power so that the amount of heat generation becomes a second amount of heat generation larger than the first amount of heat generation;
wherein
the control device further comprises a purging mode switching part configured to switch a purging mode of the fuel cell to a first purging mode or a second purging mode,
the first purging mode is a purging mode purging the inside of the fuel cell without making the fuel cell generate power when a temperature of the fuel cell becomes equal to or less than a freezing point during the time period in which the fuel cell system is stopped,
the second purging mode is a purging mode purging the inside of the fuel cell in the state of making the fuel cell generate power when the fuel cell system is stopped, and
the low efficiency power generation part is configured so as to lower the standard temperature when the purging mode of the fuel cell is the second purging mode compared to when the inside of the fuel cell is purged in the case of the first purging mode; and
wherein
the low efficiency power generation part is configured to:
set the standard temperature to a predetermined first temperature when the inside of the fuel cell is purged in the case where the purging mode is the first purging mode; and
set the standard temperature to a predetermined second temperature lower than the first temperature when the purging mode is the second purging mode, and wherein
the first temperature is a temperature at which an increase of a resistance value of the fuel cell in an overdried state in which an amount of water of an electrolytic membrane is less than a predetermined amount becomes more remarkable if the temperature of the fuel cell becomes less than the first temperature compared to when the temperature of the fuel cell is equal to or greater than the first temperature, and
the second temperature is a temperature at which an increase of a resistance value of the fuel cell in a wet state in which an amount of water of an electrolytic membrane is more than a predetermined amount becomes more remarkable if the temperature of the fuel cell becomes less than the second temperature compared to when the temperature of the fuel cell is equal to or greater than the second temperature.

2. The fuel cell system according to claim 1, wherein the standard temperature is a temperature at which an increase of a resistance value of the fuel cell in an overdried state, in which an amount of water of an electrolytic membrane is less than a predetermined amount, is higher if the temperature of the fuel cell becomes less than the standard temperature compared to when the temperature of the fuel cell is equal to or greater than the standard temperature.

3. The fuel cell system according to claim 1, wherein the predetermined cumulative value is a value at which an amount of generated water from when power generation of the fuel cell is started, produced along with power generation of the fuel cell, becomes equal to or greater than a predetermined amount.

4. The fuel cell system according to claim 1, wherein the predetermined cumulative value is any value selected from a range from 100 C to 400 C.

5. A control method for a fuel cell system, wherein the fuel cell system comprises a fuel cell configured to generate electric power by electrochemical reactions between a fuel gas and oxidizing agent gas; and wherein the control method comprises:
  performing low efficiency power generation with a power generation loss larger than a power generation loss during normal power generation;
  making the fuel cell generate power so that the amount of heat generation of the fuel cell accompanying the power generation loss becomes a first amount of heat generation when a temperature of the fuel cell at the time of start of power generation of the fuel cell is less than a standard temperature;
  making the fuel cell generate power so that the amount of heat generation becomes a second amount of heat generation larger than the first amount of heat generation when a cumulative value of current of a time period during which the fuel cell is made to generate power so that the amount of heat generation becomes the first amount of heat generation is equal to or greater than a predetermined cumulative value;
  switching a purging mode of the fuel cell to a first purging mode or a second purging mode,
  the first purging mode is a purging mode purging the inside of the fuel cell without making the fuel cell generate power when a temperature of the fuel cell becomes equal to or less than a freezing point during the time period in which the fuel cell system is stopped,
  the second purging mode is a purging mode purging the inside of the fuel cell in the state of making the fuel cell generate power when the fuel cell system is stopped, and
  low efficiency power generation lowers the standard temperature when the purging mode of the fuel cell is the second purging mode compared to when the inside of the fuel cell is purged in the case of the first purging mode;
  setting the standard temperature to a predetermined first temperature when the inside of the fuel cell is purged in the case where the purging mode is the first purging mode; and
  setting the standard temperature to a predetermined second temperature lower than the first temperature when the purging mode is the second purging mode, and wherein
the first temperature is a temperature at which an increase of a resistance value of the fuel cell in an overdried state in which an amount of water of an electrolytic membrane is less than a predetermined amount becomes more remarkable if the temperature of the fuel cell becomes less than the first temperature compared to when the temperature of the fuel cell is equal to or greater than the first temperature, and
the second temperature is a temperature at which an increase of a resistance value of the fuel cell in a wet state in which an amount of water of an electrolytic membrane is more than a predetermined amount becomes more remarkable if the temperature of the fuel cell becomes less than the second temperature compared to when the temperature of the fuel cell is equal to or greater than the second temperature.

* * * * *